(12) United States Patent
Ishihara et al.

(10) Patent No.: US 11,941,247 B2
(45) Date of Patent: Mar. 26, 2024

(54) STORAGE DEVICE, STORAGE SYSTEM, AND METHOD

(71) Applicant: Kioxia Corporation, Tokyo (JP)

(72) Inventors: Takeshi Ishihara, Yokohama (JP); Yohei Hasegawa, Fuchu (JP); Shinichi Kanno, Ota (JP); Kohei Okuda, Koganei (JP); Masataka Goto, Yokohama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/118,996

(22) Filed: Dec. 11, 2020

(65) Prior Publication Data

US 2021/0278972 A1 Sep. 9, 2021

(30) Foreign Application Priority Data

Mar. 5, 2020 (JP) .................................. 2020-037710

(51) Int. Cl.
*G06F 12/00* (2006.01)
*G06F 3/06* (2006.01)

(52) U.S. Cl.
CPC .......... *G06F 3/0608* (2013.01); *G06F 3/0652* (2013.01); *G06F 3/0679* (2013.01)

(58) Field of Classification Search
CPC .... G06F 3/0608; G06F 3/0652; G06F 3/0679; G06F 3/0644
See application file for complete search history.

(56) References Cited

U.S. PATENT DOCUMENTS

| 9,122,585 B2 | 9/2015 | Shim et al. |
| 9,305,662 B2 | 4/2016 | Tsai et al. |
| 2011/0106771 A1* | 5/2011 | McDonald ............ G06F 16/182 707/663 |

(Continued)

FOREIGN PATENT DOCUMENTS

JP 2017-123110 A 7/2017

OTHER PUBLICATIONS

Berg, B. et al., "The CacheLib Caching Engines: Design and Experiences at Scale," Proceedings of the 14th USENIX Symposium on Operating Systems Designs and Implementation, Nov. 4-6, 2020, https://www.usenix.org/system/files/osdi20-berg.pdf, 19 pages.

(Continued)

*Primary Examiner* — Daniel D Tsui
(74) *Attorney, Agent, or Firm* — Oblon, McClelland, Maier & Neustadt, L.L.P.

(57) ABSTRACT

According to one embodiment, a storage device includes a non-volatile memory and a control unit that is electrically connected to the non-volatile memory and that is configured to control the non-volatile memory. The control unit is configured to manage a plurality of management areas obtained by logically partitioning storage area of the non-volatile memory, when a write request is received that includes data for which a valid term has been set, determine, based on the valid term, a first management area from among the management areas, write the data included in the write request to the determined first management area, and when the data written to the first management area is erased, collectively erase all data written in the first management area which includes the data.

10 Claims, 26 Drawing Sheets

(56) References Cited

U.S. PATENT DOCUMENTS

| | | | | |
|---|---|---|---|---|
| 2012/0278293 A1* | 11/2012 | Bulkowski | ............. | G06F 16/27 707/703 |
| 2013/0132638 A1* | 5/2013 | Horn | .................. | G06F 12/0871 711/103 |
| 2017/0199817 A1 | 7/2017 | Ishihaha et al. | | |

OTHER PUBLICATIONS

Bjørling, M., "From Open-Channel SSDs to Zoned Namespaces," Jan. 23, 2019, https://www.usenix.org/sites/default/files/conference/protectedfiles/nsdi19_slides_binding.pdf, 18 pages.

Bjørling M., "New NVMe™ Specification Defines Zoned Namespace (ZNS) as Go-To Industry Technology," Jun. 18, 2019, https://nvmexpress.org/new-nvmetmspecification-defines-zoned-namespaces-znsas-go-to-industry-technology/, 3 pages.

Hwan-Jin Y. et al., "SK Hynix runs first demo on next-generation enterprise SSD," Mar. 25, 2019, https://pulsenews.co.kr/view.php?year=2019&no=179264, 2 pages.

* cited by examiner

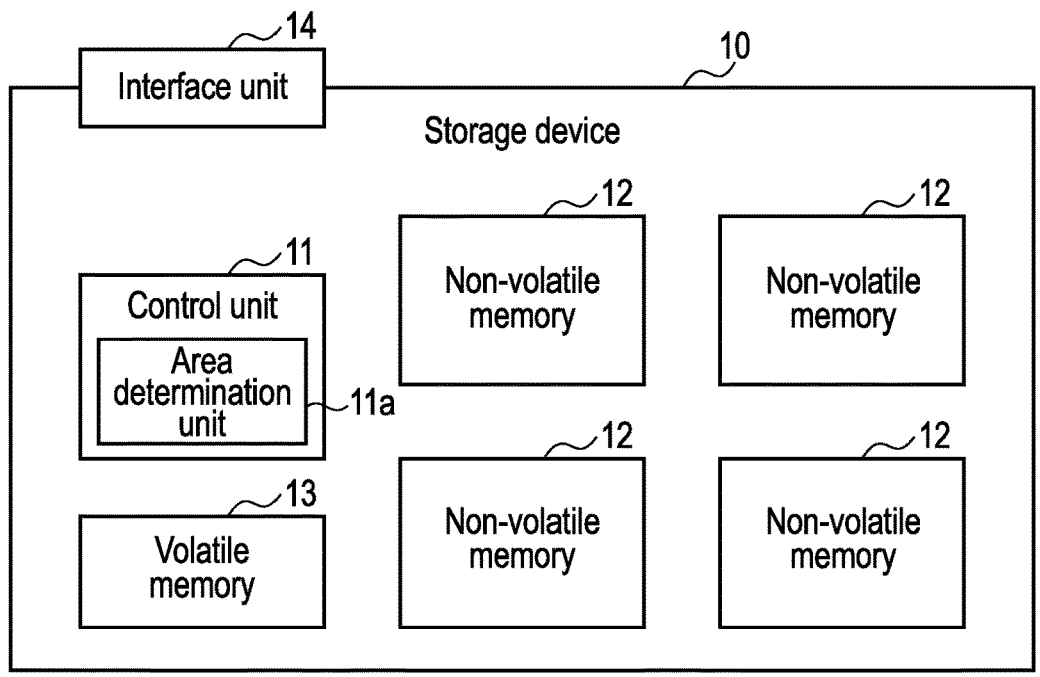
F I G. 1
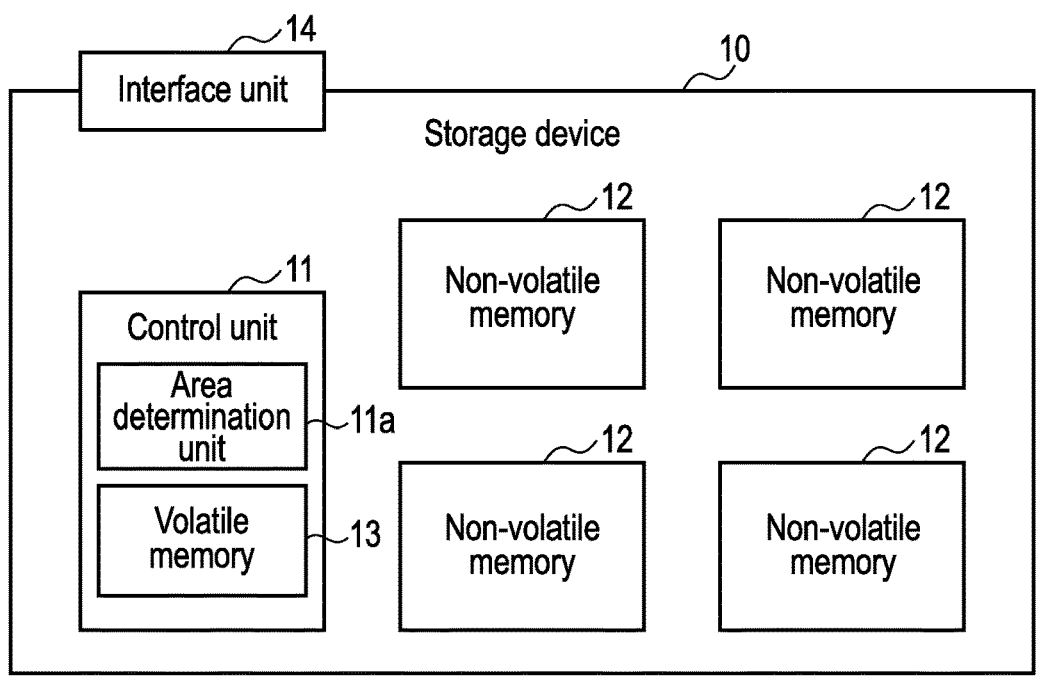
F I G. 2

| Management area information | Valid term information |
|---|---|
| N1 | 144H- |
| N2 | – |
| N3 | 0H-24H |
| N4 | 24H-48H |
| … | … |

F I G. 7

| Management area information | Valid term information |
|---|---|
| N1 | 120H-144H |
| N2 | 144H- |
| N3 | – |
| N4 | 0H-24H |
| … | … |

F I G. 8

| Order | Management area information | Valid term information |
|---|---|---|
| 7 | N1 | 24H |
| – | N2 | – |
| 1 | N3 | 24H |
| 2 | N4 | 24H |
| … | … | … |

F I G. 9

| Management area information | Valid term information | Write start address |
|---|---|---|
| N1 | 144H- | A1 |
| N2 | – | A2 |
| N3 | 0H-24H | A3 |
| N4 | 24H-48H | A4 |
| ... | ... | ... |

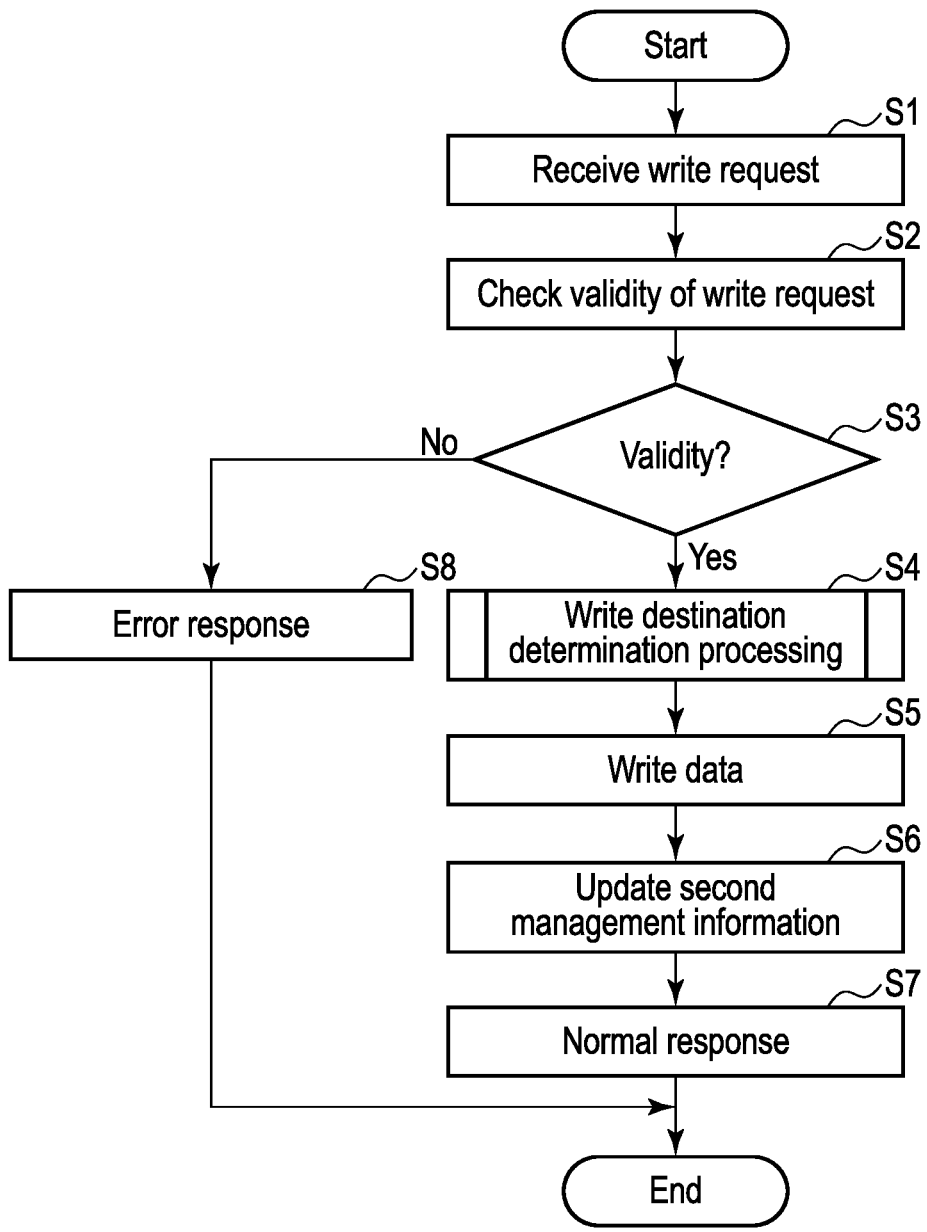
F I G. 12

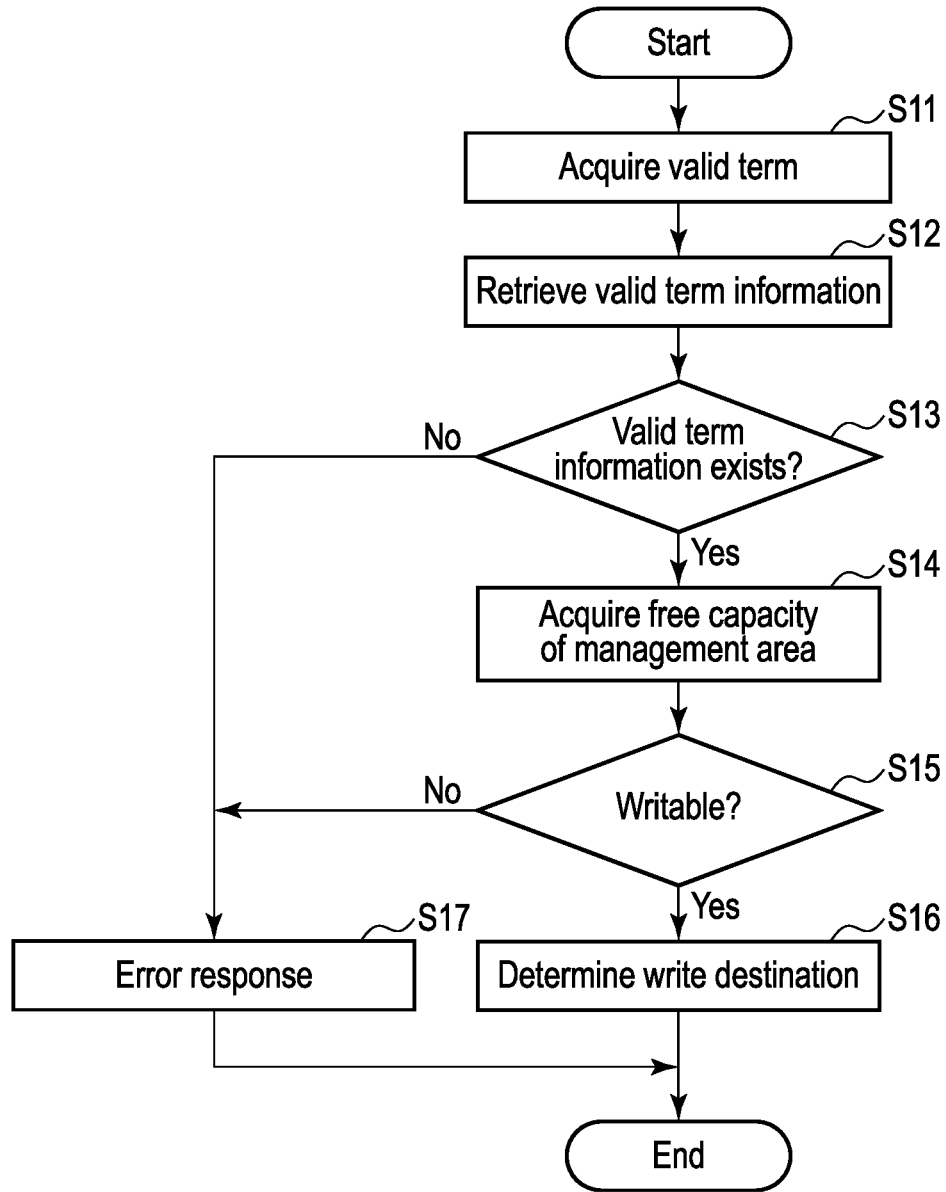
F I G. 13

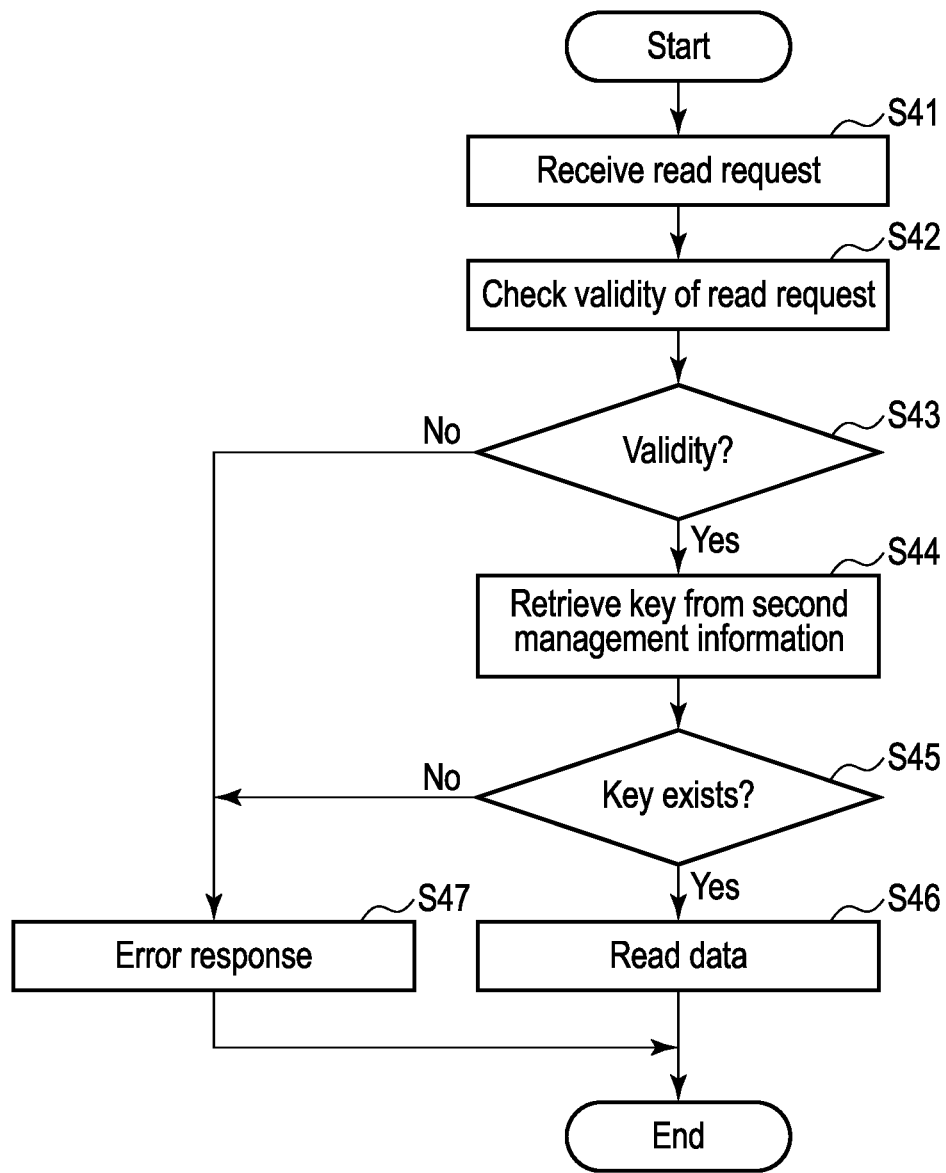
F I G. 17

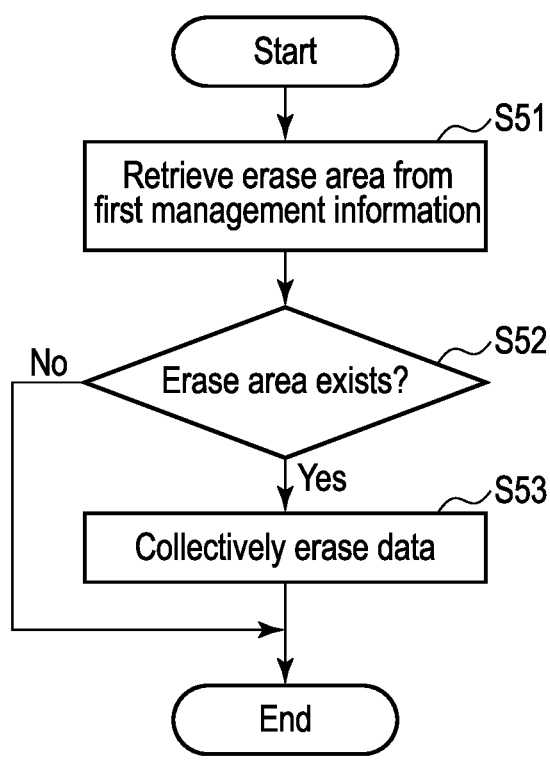
F I G. 21

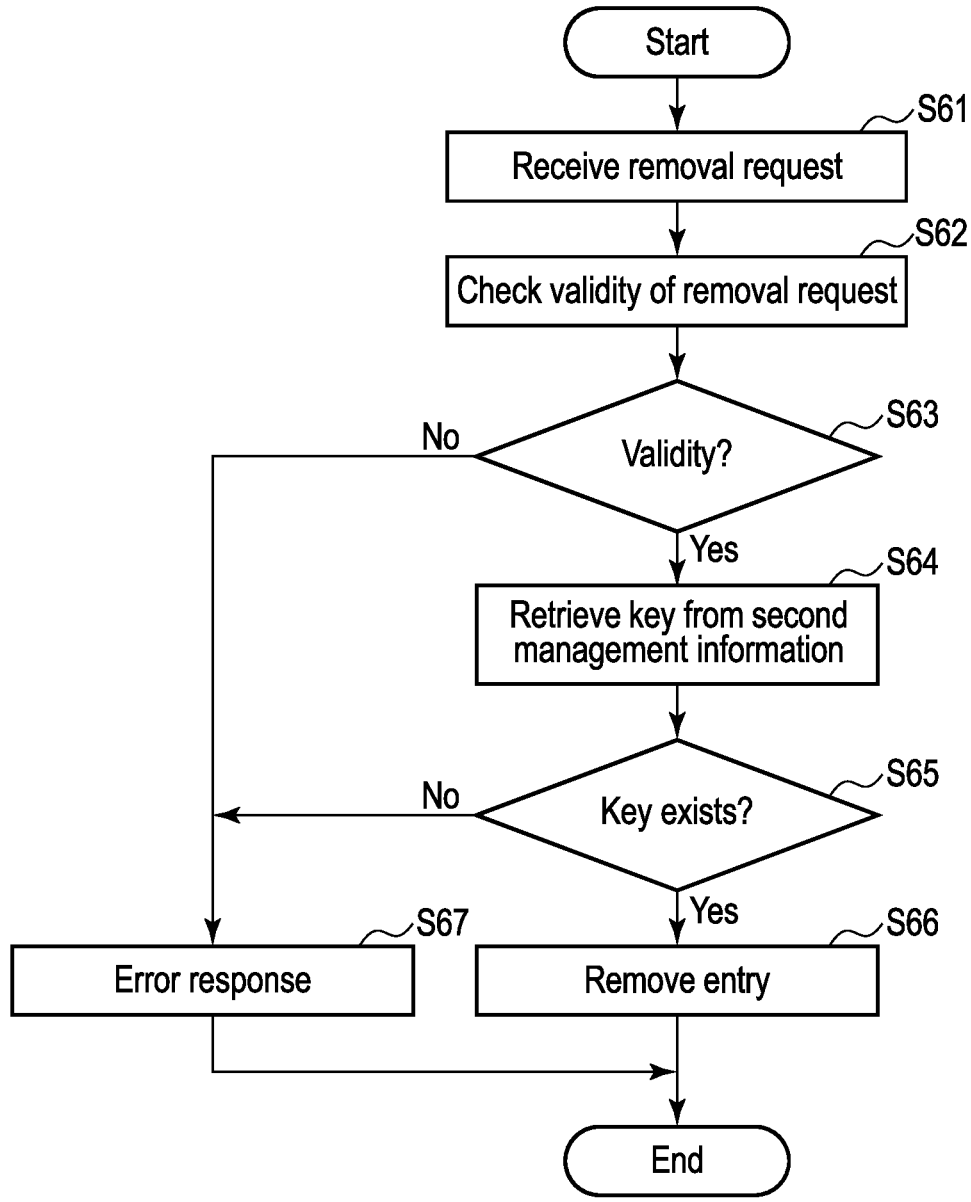
F I G. 22

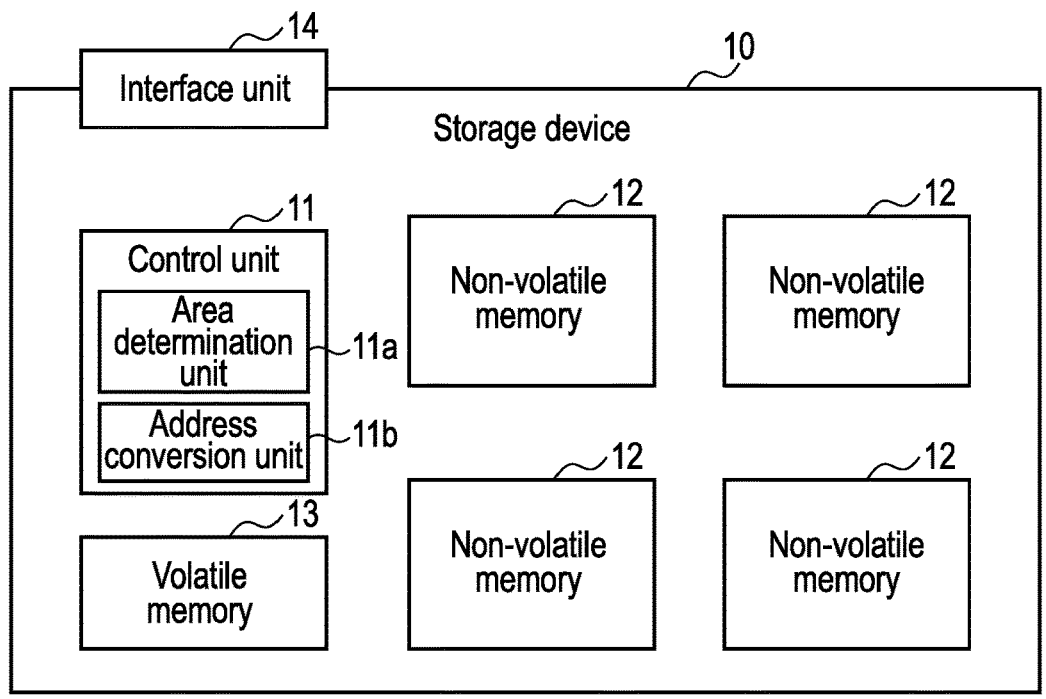
F I G. 23
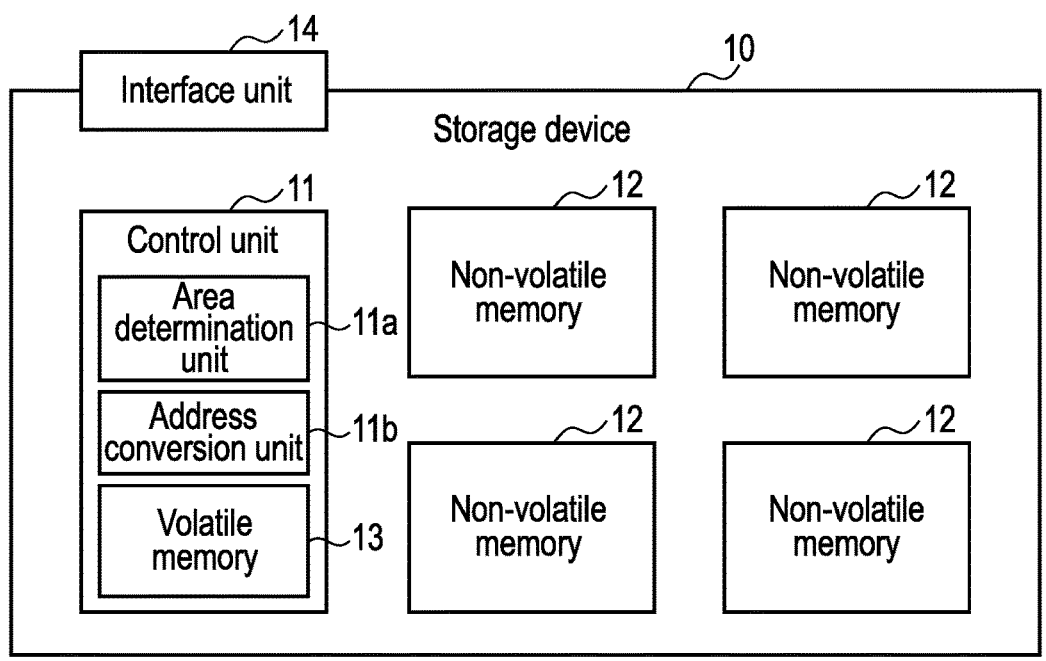
F I G. 24

| Internal address | Logical address |
|---|---|
| F-LA1 | S-LA1 |
| F-LA2 | S-LA2 |
| ... | ... |

| Internal address | Management area information | Logical address |
|---|---|---|
| F-LA1 | 1 | S-LA1 |
| F-LA2 | 1 | S-LA2 |
| ... | ... | ... |

| Key | Size | Valid term information | Management area information | External address |
|-----|------|------------------------|------------------------------|------------------|
| K1  | L1   | D1                     | N1                           | LA1              |
| K2  | L2   | D2                     | N1                           | LA1+L1           |
| ... | ...  | ...                    | ...                          | ...              |
| K   | L3   | D                      | Nx                           | LA3              |
| ... | ...  | ...                    | ...                          | ...              |

| Management area information | Write start address |
|------------------------------|---------------------|
| N1 | LAS1 |
| N2 | LAS2 |
| N3 | LAS3 |
| N4 | LAS4 |
| ... | ... |

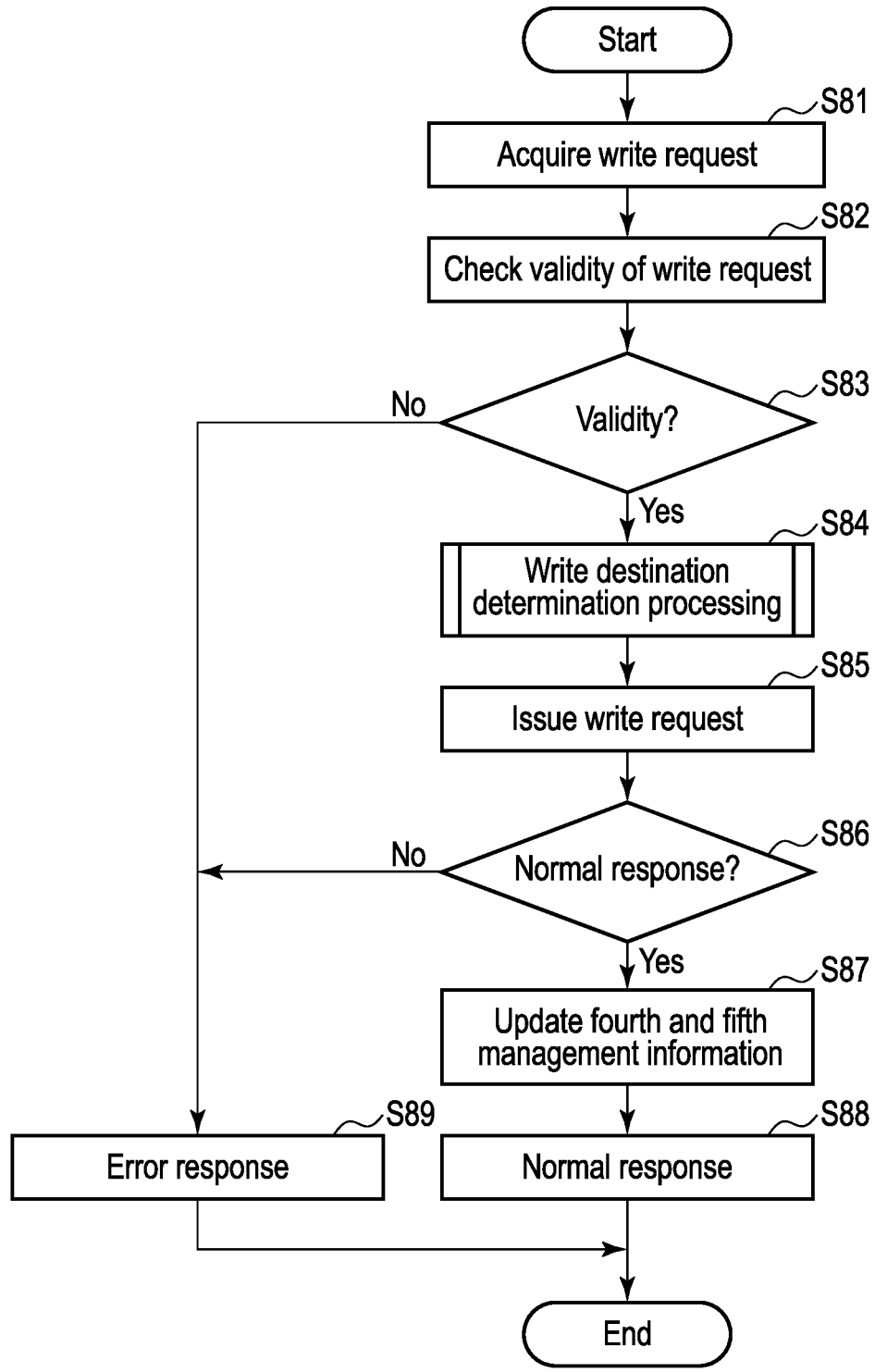
F I G. 34

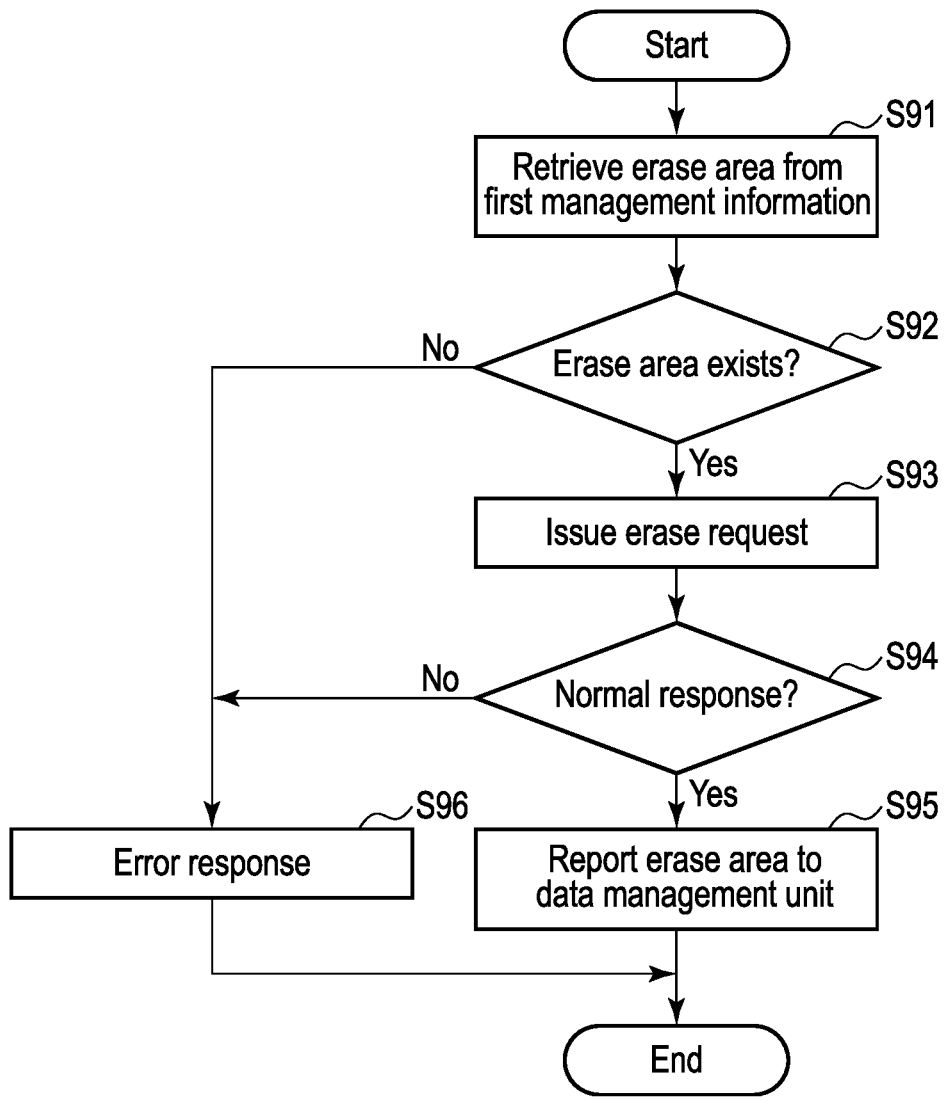
F I G. 35

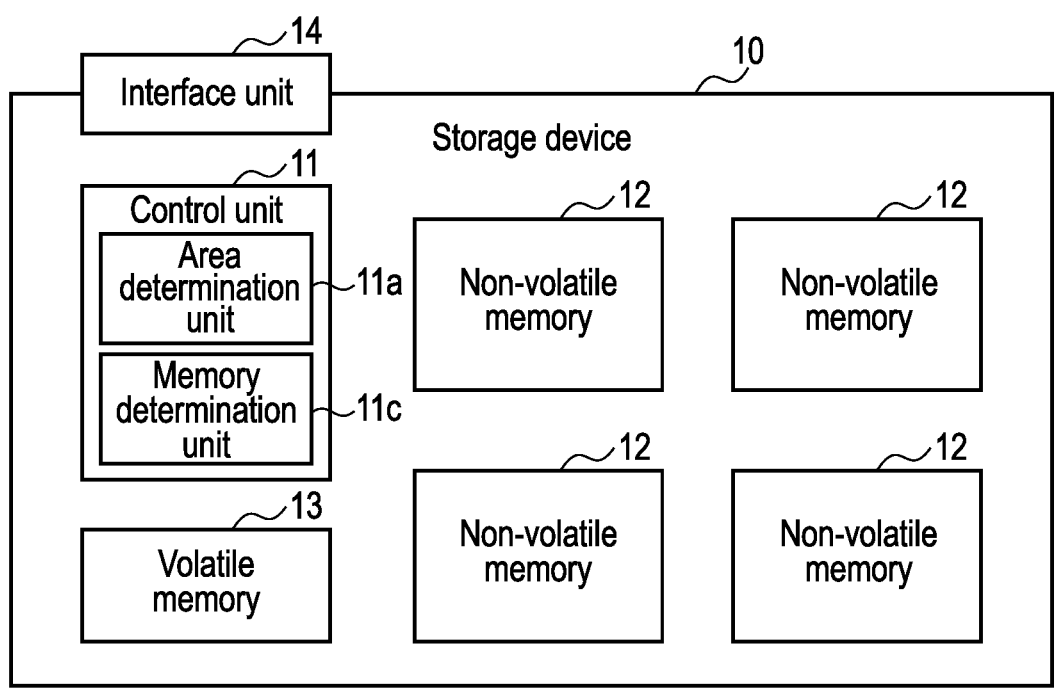
F I G. 36

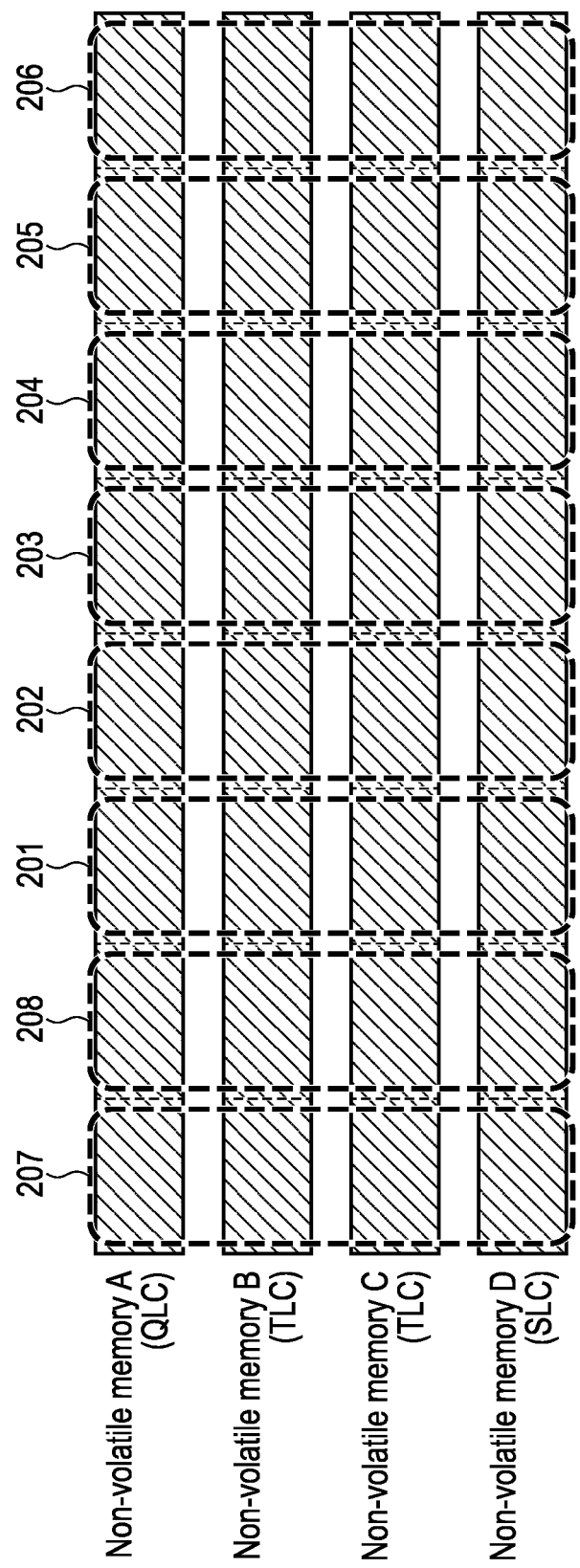
F I G. 37

| | N1 | N2 | N3 | N4 | N5 | N6 | N7 | N8 |
|---|---|---|---|---|---|---|---|---|
| Memory A | SA1 | SA2 | SA3 | SA4 | SA5 | SA6 | SA7 | SA8 |
| Memories B,C | SBC1 | SBC2 | SBC3 | SBC4 | SBC5 | SBC6 | SBC7 | SBC8 |
| Memory D | SD1 | SD2 | SD3 | SD4 | SD5 | SD6 | SD7 | SD8 |

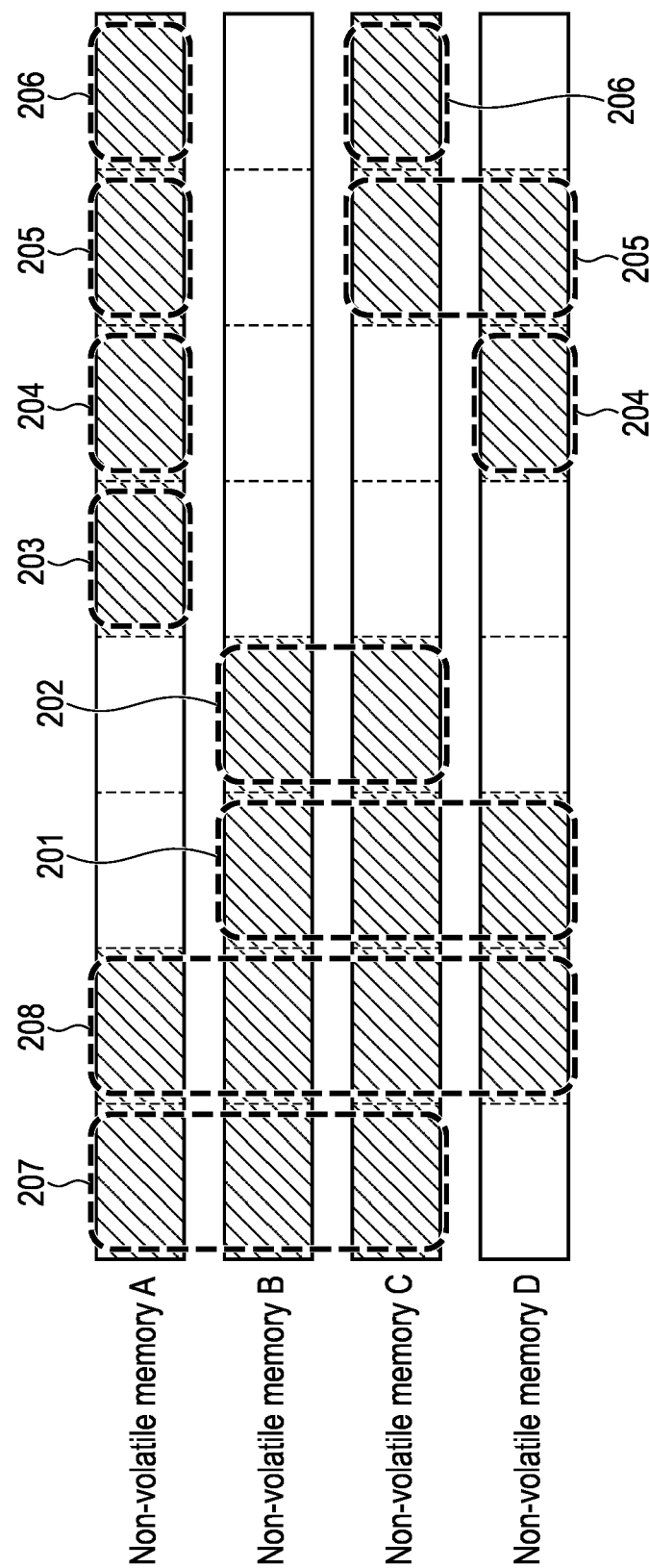
F I G. 41

STORAGE DEVICE, STORAGE SYSTEM, AND METHOD

CROSS-REFERENCE TO RELATED APPLICATIONS

This application is based upon and claims the benefit of priority from Japanese Patent Application No. 2020-037710, filed Mar. 5, 2020, the entire contents of which are incorporated herein by reference.

FIELD

Embodiments described herein relate generally to a storage device, and a storage system and method.

BACKGROUND

Typically, a non-volatile memory (storage element) such as a NAND flash memory are used in a storage device used on a cache server, or the like, which is designed for the purpose of temporarily saving data, for example.

Because the performance of this kind of non-volatile memory changes (that is, degrades) through usage, suppressing the usage count is effective in suppressing degradation of a non-volatile memory.

BRIEF DESCRIPTION OF THE DRAWINGS

FIG. 1 is a block diagram schematically illustrating an example of the configuration of a storage device according to a first embodiment.

FIG. 2 is a diagram illustrating the configuration of the storage device in a case where a volatile memory is provided inside a control unit.

FIG. 7 is a diagram illustrating an example of first management information.

FIG. 8 is a diagram illustrating first management information after a reference time is updated.

FIG. 9 is a diagram illustrating another example of the first management information.

FIG. 12 is a flowchart illustrating an example of a processing procedure for write processing.

FIG. 13 is a flowchart illustrating an example of a processing procedure for write destination determination processing.

FIG. 17 is a flowchart illustrating an example of a processing procedure for read processing.

FIG. 21 is a flowchart illustrating an example of a processing procedure for erase processing.

FIG. 22 is a flowchart illustrating an example of a processing procedure for removal processing.

FIG. 23 is a block diagram schematically illustrating an example of the configuration of a storage device according to a second embodiment.

FIG. 24 is a diagram illustrating the configuration of the storage device in a case where a volatile memory is provided inside a control unit.

FIG. 34 is a flowchart illustrating an example of a processing procedure for write processing.

FIG. 35 is a flowchart illustrating an example of a processing procedure for erase processing.

FIG. 36 is a block diagram schematically illustrating an example of the configuration of a storage device according to a fourth embodiment.

FIG. 37 is a diagram to illustrate an example of the relationship between a plurality of management areas and a plurality of non-volatile memories.

FIG. 41 is a diagram to illustrate another example of the relationship between a plurality of management areas and a plurality of non-volatile memories.

DETAILED DESCRIPTION

Figure 3:
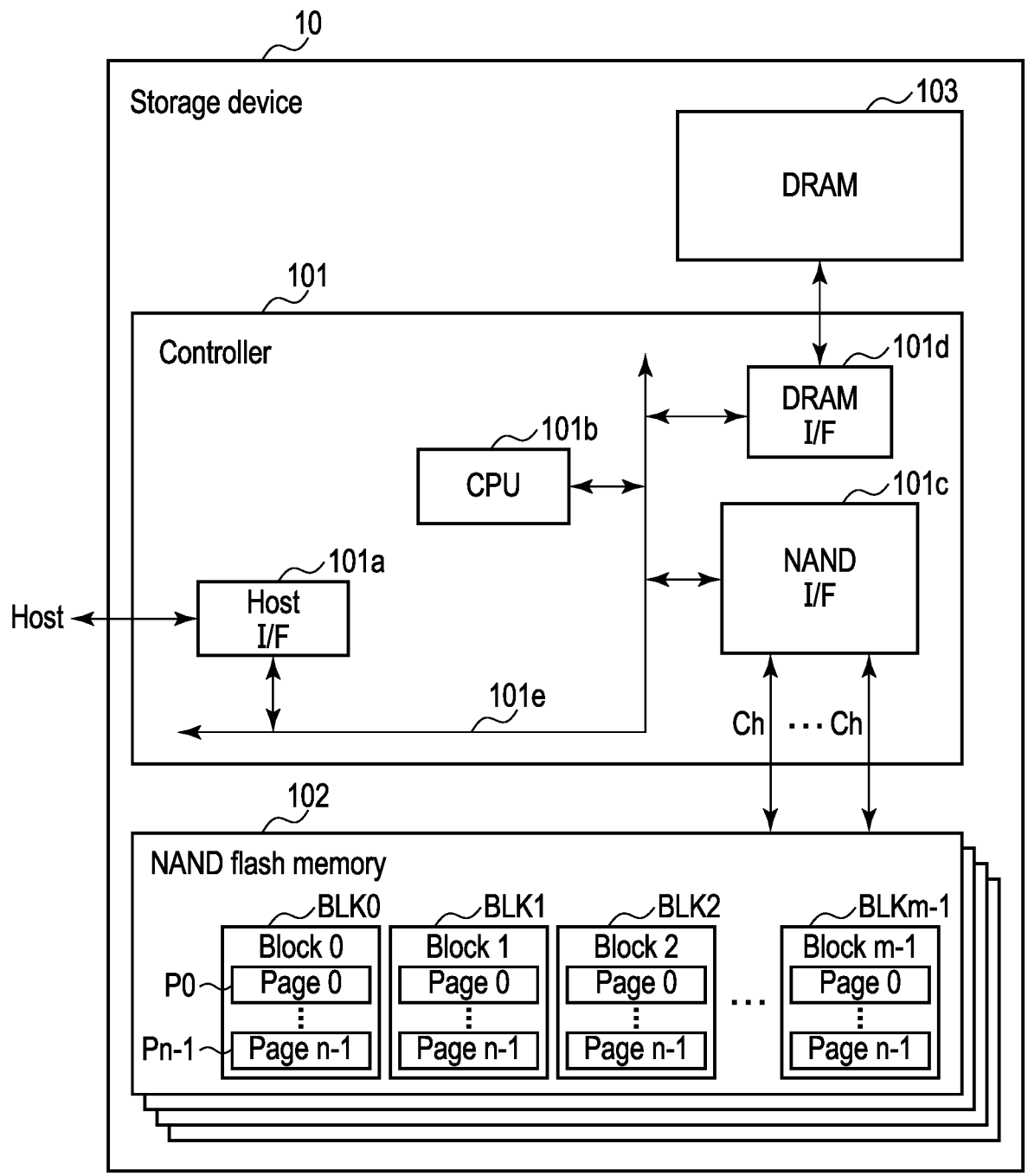
FIG. 3 is a diagram illustrating a specific configuration example of the storage device.

Various embodiments will be described hereinafter with reference to the accompanying drawings.

In general, according to one embodiment, a storage device comprises a non-volatile memory and a control unit that is electrically connected to the non-volatile memory and that is configured to control the non-volatile memory. The control unit is configured to manage a plurality of management areas obtained by logically partitioning storage area of the non-volatile memory, when a write request is received that includes data for which a valid term has been set, determine, based on the valid term, a first management area from among the management areas, write the data included in the write request to the determined first management area, and when the data written to the first management area is erased, collectively erase all data written in the first management area which includes the data.

First Embodiment

FIG. 1 is a block diagram schematically illustrating the configuration of the storage device according to the first embodiment. As illustrated in FIG. 1, the storage device 10 includes a control unit 11, non-volatile memories 12, a volatile memory 13, and an interface unit 14.

The control unit 11 has a function for governing the operation of the storage device 10. The control unit 11 may, for example, be realized by an application specific integrated circuit (ASIC) or a field programmable gate array (FPGA) which is mounted as a hardware circuit for executing various types of processing, or may be realized by a generic processor and software (programs) which are executed by the processor. Furthermore, the control unit 11 may be realized by a combination of hardware and software. Note that the details will be described subsequently, but the control unit 11 includes an area determination unit 11a that executes processing to determine an area to which data is written (that is, a write destination).

The non-volatile memories 12 are configured to be capable of storing various types of data, for example, and are realized by a non-volatile semiconductor memory such as a NAND flash memory, a phase change memory (PCM), or a magnetoresistive random-access memory (MRAM), for example. Note that, although the storage device 10 is provided with four non-volatile memories 12 in FIG. 1, the number of non-volatile memories 12 provided in the storage device 10 may be a number other than four.

The volatile memory 13 functions as a temporary buffer for software executed by the control unit 11 or as a temporary buffer for the non-volatile memories 12, for example. The volatile memory 13 may also be used to temporarily store various types of management information or data, or the like. The volatile memory 13 is realized by a volatile semiconductor memory such as a dynamic random access memory (DRAM) or a static random-access memory (SRAM), for example. Note that in place of the volatile memory 13, a non-volatile memory with relatively higher speed than that of the non-volatile memories 12 may be used, or a combination of the volatile memory 13 and a non-volatile memory with relatively higher speed than that of the non-volatile memories 12 may be used. Further, in the non-volatile memories 12, there may be provided a region where part of data overflown from the volatile memory 13 can be stored.

The interface unit 14 has a function for connecting the storage device 10 to the outside such as a host, for example. A peripheral component interconnect (PCI) express (registered trademark) or a non-volatile memory (NVM) express (registered trademark), or the like, for example, may be used as the interface unit 14, but the interface unit 14 is not limited thereto.

Note that, depending on the configuration of the software executed by the control unit 11, the volatile memory 13 need not be connected to the outside of the control unit 11. In this case, as illustrated in FIG. 2, the volatile memory 13 only has to be provided inside the control unit 11.

FIG. 3 is a diagram illustrating a specific configuration example of the storage device 10 illustrated in FIG. 1. As illustrated in FIG. 3, the storage device 10 is provided with a controller 101, NAND flash memory 102, and a DRAM 103. The controller 101 illustrated in FIG. 3 corresponds to the control unit 11 illustrated in FIG. 1. Furthermore, the NAND flash memory 102 illustrated in FIG. 3 corresponds to the non-volatile memories 12 illustrated in FIG. 1. Further, the DRAM 103 illustrated in FIG. 3 corresponds to the volatile memory 13 illustrated in FIG. 1. Note that the interface unit 14 illustrated in FIG. 1 (the configuration corresponding to) has been omitted from FIG. 3.

The controller 101 includes a host interface (I/F) 101a, a CPU 101b, a NAND interface (I/F) 101c, and a DRAM interface (I/F) 101d, and the like. Note that the host interface 101a, the CPU 101b, the NAND interface 101c, and the DRAM interface 101d are interconnected via a bus 101e.

The host interface 101a is a host interface circuit configured to perform communications with a host disposed outside the storage device 10. The host interface 101a is a PCI Express controller or the like, for example. The host interface 101a receives various requests (commands) from the host. Such requests include write requests requesting data writing and read requests requesting data reading (readout), and the like.

The CPU 101b is a processor configured to control the host interface 101a, the NAND interface 101c, and the DRAM interface 101d. In response to power-on of the storage device 10, the CPU 101b performs various types of processing by loading, to the DRAM 103, a control program (firmware) from the NAND flash memory 102 or a read-only memory (ROM) (not illustrated), and by executing the control program. The CPU 101b is capable of executing processing in response to the various requests from the host. Operation of the CPU 101b is controlled by the control program executed by the CPU 101b. Note that some or all of the processing in response to requests from the host may also be executed by dedicated hardware in the controller 101.

Note that, although the CPU 101b is described here as being included in the controller 101, the configuration in which the controller 101 includes the CPU 101b is an example, and the controller 101 may also be realized by hardware for executing various types of processing or may be realized by software. Further, the controller 101 may be realized by a combination of hardware and software.

The NAND interface 101c is a memory control circuit which is governed by the CPU 101b and which is configured to control the NAND flash memory 102.

Note that the controller 101 (control unit 11) is electrically connected to the NAND flash memory 102 (non-volatile memories 12) via the NAND interface 101c. That is, the controller 101 is a memory controller (control circuit) configured to control the NAND flash memory 102.

The DRAM interface 101d is a DRAM control circuit which is governed by the CPU 101b and configured to control the DRAM 103.

The NAND flash memory 102 include memory arrays containing a plurality of memory cells arranged in the form of a matrix. The NAND flash memory 102 may be NAND flash memory of a two-dimensional structure or may be NAND flash memory of a three-dimensional structure.

The memory cell arrays of the NAND flash memory 102 include a plurality of blocks BLK0 to BLKm−1. Blocks BLK0 to BLKm−1 are each organized by a multiplicity of pages (pages P0 to Pn−1 here). Blocks BLK0 to BLKm−1 function as erase units. Blocks are sometimes referred to as "physical blocks", "erase blocks", or "physical erase blocks". Pages P0 to Pn−1 each include a plurality of memory cells connected to the same word line. Pages P0 to Pn−1 are units for data write operations and data read operations.

Note that, in the case of a configuration in which the storage device 10 is provided with four NAND flash memory 102 (non-volatile memories 12) as described hereinabove, four channels Ch are connected to the NAND interface 101c included in the controller 101, and the NAND flash memory 102 are connected to each of the channels, respectively.

In the storage device 10 according to this embodiment, for example, the DRAM 103 stores management information for managing data written to the NAND flash memory 102. The details of the management information will be described subsequently.

Here, in this embodiment, a case is assumed where the storage device 10 is used on a cache server, or the like, designed with the objective of temporarily storing data. On the cache server, various types of data are cached (saved) in the storage device 10, and a term during which the data is stored by being cached (appearing hereinbelow as "valid term") is set. Note that the valid term is also referred to as the lifetime, for example.

Incidentally, the aforementioned non-volatile memories 12 provided in the storage device 10 (the NAND flash memory 102, for example) are known to degrade according to the usage count, and suppressing the usage count is useful for suppressing degradation of the non-volatile memories 12.

Hence, in this embodiment, managing data by utilizing valid terms which have been set for the data enables suppression of the degradation (that is, an increased lifetime) of the non-volatile memories 12.

An overview of the storage area (non-volatile storage area) of the non-volatile memories 12 which are managed in the storage device 10 according to this embodiment will be provided hereinbelow.

Figure 4:
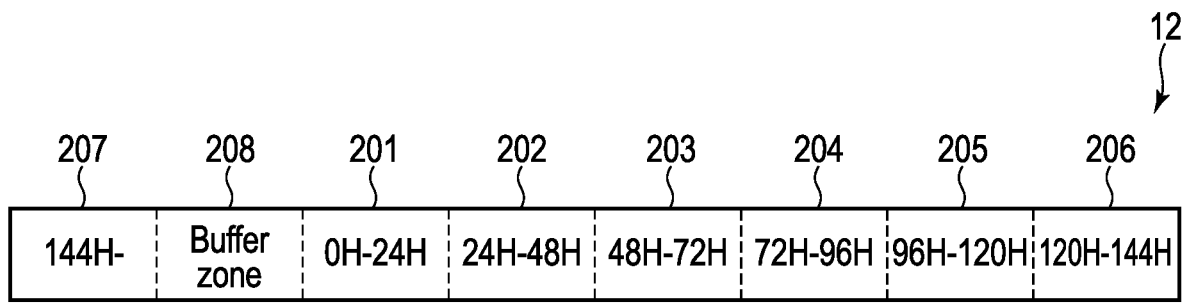
FIG. 4 is a diagram to illustrate an example of management areas.

In this embodiment, the storage area of non-volatile memories 12 is managed by being partitioned logically into a plurality of areas (appearing hereinbelow as "management areas"), as illustrated in FIG. 4. In the example illustrated in FIG. 4, the storage area of the non-volatile memories 12 is partitioned into eight management areas 201 to 208. Note that, in a case where the storage device 10 is used on a cache server as mentioned above, the management areas 201 to 208 correspond to a storage area which can be used as a data cache among the storage area of all four of the non-volatile memories 12 illustrated in FIG. 1, for example. Note that the management areas are configured in at least one or more basic rewrite units. In a case where the non-volatile memory 12 is a NAND flash memory 102, the basic rewrite units are the aforementioned blocks.

Here, valid terms are assigned to the management areas 201 to 207. More specifically, the management area 201 is assigned a term of up to 24 hours after a reference time as a valid term, for example. Note that, in FIG. 4, the valid term assigned to management area 201 appears as "0H to 24H".

Accordingly, when the end time (date and time) of a valid term which has been set for the data corresponds to a time of up to 24 hours after the reference time, for example, management area 201 is then the write destination of the data.

Meanwhile, management area 202 is assigned a term from 24 hours up to 48 hours after the reference time as a valid term. Note that, in FIG. 4, the valid term assigned to management area 202 appears as "24H to 48H". Accordingly, when the end time (date and time) of a valid term which has been set for the data corresponds to a time from 24 hours up to 48 hours after the reference time, for example, management area 202 is then the write destination of the data.

Management areas 201 and 202 have been described here, but the same is true for the other management areas. More specifically, management area 203 is assigned a term from 48 hours up to 72 hours (48H to 72H) after the reference time as a valid term; management area 204 is assigned a term from 72 hours up to 96 hours (72H to 96H) after the reference time as a valid term; management area 205 is assigned a term from 96 hours up to 120 hours (96H to 120H) after the reference time as a valid term; management area 206 is assigned a term from 120 hours up to 144 hours (120H to 144H) after the reference time as a valid term; and management area 207 is assigned a term from 144 hours and beyond (144H-) after the reference time as a valid term.

According to such valid terms assigned to the management areas 201 to 207, the write destination when writing the data to the non-volatile memory 12 can be configured to be the management area which corresponds to the valid term which has been set for the data.

Note that the aforementioned reference time is not the current time but instead a value which has been suitably set according to the management areas managed in the storage device 10 (for example, the number and size of the management areas, and the valid terms assigned to the management areas, and so forth). The reference time may be a value used as a breakpoint such as 00:00:00, for example, or may be an optional value such as 04:32:10, for example. Note that the reference time is updated at fixed intervals.

Further, unlike management areas 201 to 207, management area 208 is not assigned a valid term. This management area 208 is called the "buffer zone", for example, and is provided as an area which is to be used in a case where data which cannot be written to the other management areas 201 to 207 is temporarily stored, where the timing for removing data is adjusted, or where the size of the aforementioned management areas 201 to 207 is changed. Note that, because a "buffer zone" like the management area 208 is not essential, management area 208 may also be omitted. Furthermore, when management area 208 is not used as a "buffer zone", a valid term may also be set for management area 208.

Figure 5:
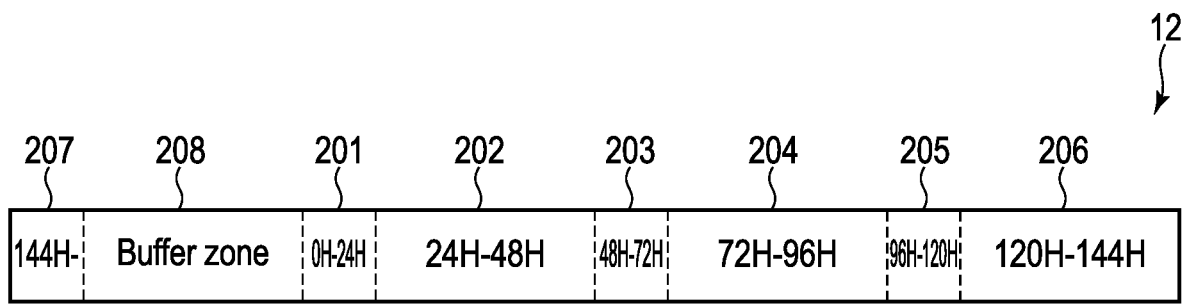
FIG. 5 is a diagram illustrating another example of management areas.

Here, although, in the example illustrated in FIG. 4, the whole storage area of the non-volatile memories 12 that can be used as a data cache is partitioned so that the respective sizes (capacities) of the management areas 201 to 208 are the same, the sizes of each of the management areas 201 to 208 may also be different. More specifically, management areas 201 to 208 may include a mixture of large-sized areas (that is, areas with a large writable data amount) and small-sized areas (that is, areas with a small writable data amount), as illustrated in FIG. 5. Accordingly, when the valid term which has been set for the data is subject to a bias (periodicity), for example, a situation where data can no longer be written to the management areas can be prevented from occurring by increasing the sizes of the management areas to which frequently set valid terms are assigned.

Figure 6:
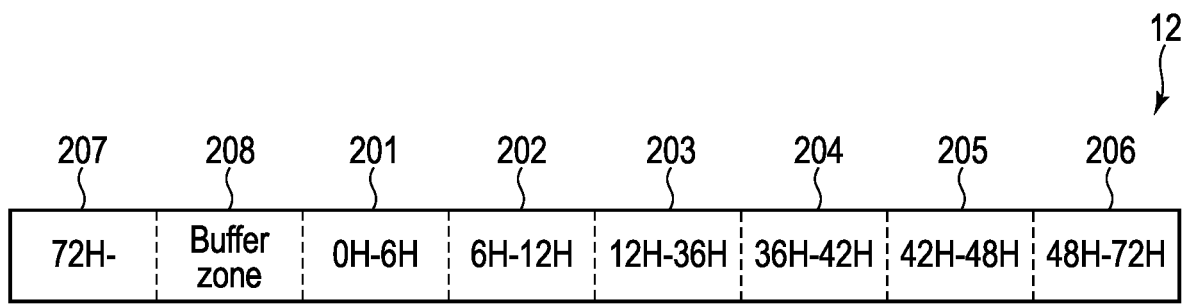
FIG. 6 is a diagram illustrating yet another example of management areas.

Furthermore, although the respective lengths of the valid terms assigned to management areas 201 to 206 illustrated in FIG. 4 are 24 hours, the lengths of the valid terms may be terms other than 24 hours and the lengths of the valid terms may differ between management areas 201 to 206, as illustrated in FIG. 6. In the example illustrated in FIG. 6, the valid terms assigned are "0H to 6H" to management area 201, "6H to 12H" to management area 202, "12H to 36H" to management area 203, "36H to 42H" to management area 204, "42H to 48H" to management area 205, and "48H to 72H" to management area 206. In other words, in the example illustrated in FIG. 6, valid terms are assigned using intervals for which six hours, six hours, and 24 hours are used as references.

In addition, the number by which the storage area of the non-volatile memories 12 is partitioned (that is, the number of management areas) does not need to be eight. For example, when the amount of data stored changes periodically as mentioned above, the storage area of the non-volatile memories 12 may be partitioned by a number corresponding to this periodicity. More specifically, when one week's worth of data is stored using a 24-hour period, the storage area of the non-volatile memories 12 may be partitioned into eight management areas including the aforementioned buffer zone. On the other hand, when one week's worth of data is stored using a 12-hour period, the storage area of the non-volatile memories 12 may be partitioned into 15 (a number that is twice the period+the buffer zone) management areas including the buffer zone. Note that the number by which the storage area is partitioned may also be a number that is half the number corresponding to the period, or the like.

Note that, although the size and number of management areas and the valid terms assigned to the management areas are statically determined at startup of the storage device 10, and static while the storage device 10 is operating, for example, the configuration may be such that the foregoing size, number, and valid terms are changed dynamically when an event arising during operation of the storage device 10 meets a prescribed condition, for example. More specifically, a case is assumed where the storage device 10 is configured to manage the amount of data written to the management areas 201 to 208 and to externally output the amount of data via the interface unit 14, for example. In this case, by using the results which are output from the storage device 10 to detect a periodic change in the amount of data written to the management areas 201 to 208, an administrator of the storage device 10 may adjust the size, number, and valid terms of the management areas. A configuration can also be implemented where the size, number, and valid terms of the management areas are automatically adjusted based on the results which are output from the storage device 10.

According to this embodiment, the storage area (management areas) of the non-volatile memories 12 is managed as described above, but in order to implement such management, first management information (an area-valid term mapping table) is stored in the volatile memory 13 (DRAM 103).

Here, FIG. 7 illustrates an example of the data structure of the first management information. With the first management information, correspondence, at a reference time, between the management areas and the valid terms assigned to the management areas is managed.

As illustrated in FIG. 7, the first management information includes and associates management area information and valid term information with each other. The management area information is information indicating the management areas, and it is possible to use identifiers for uniquely identifying the management areas, for example, as the management area information. Valid term information indicates the valid terms assigned to the management areas indicated by the associated management area information.

Note that FIG. 7 illustrates an example of first management information for managing the aforementioned management areas 201 to 208 described in FIG. 4. More specifically, in the example illustrated in FIG. 7, the first management information includes valid term information "144H-" which is associated with management area information "N1". Accordingly, it can be seen that the valid term assigned to the management area (management area 207 here) indicated by management area information "N1" is a term 144 hours and beyond after the reference time.

Furthermore, in the example illustrated in FIG. 7, valid term information "-" is included in the first management information in association with management area information "N2". Accordingly, it can be seen that a valid term has not been assigned to the management area (management area 208 here) indicated by management area information "N2" (that is, management area 208 is the "buffer zone").

Furthermore, in the example illustrated in FIG. 7, valid term information "0H to 24H" is included in the first management information in association with management area information "N3". Accordingly, it can be seen that the valid term assigned to the management area (management area 201 here) indicated by management area information "N3" is a term up to 24 hours after the reference time.

Furthermore, in the example illustrated in FIG. 7, it can be seen that, in the first management information, the valid term assigned to the management area (management area 202 here) indicated by management area information "N4" is a period from 24 hours up to 48 hours after the reference time.

Here, management areas 207, 208, 201, and 202 indicated by management area information "N1" to "N4" have been described, but management area information indicating the other management areas 203 to 206 and valid term information indicating the valid terms assigned to the management areas 203 to 206 are likewise also managed in the first management information.

Here, when the end time of a valid term which has been set for the data corresponds to a time from 24 hours up to 48 hours after the reference time as mentioned above, for example, the data is written to management area 202 (the management area indicated by management area information "N4"), and when one day (24 hours) passes after the data is written, the valid term for the data is 24 hours' shorter.

Hence, according to this embodiment, the valid terms managed in the first management information are changed (updated) as a result of updating the aforementioned reference time. Note that the timing for updating the reference time is determined based on the valid terms assigned to the management areas, for example. When the respective lengths of the valid terms indicated by the valid term information are 24 hours as illustrated in FIG. 7, the reference time may be updated every 24 hours. More specifically, when the reference time is "00:00:00 on February 1", for example, the reference time may be updated to "00:00:00 on February 2" at the moment "00:00:00 on February 2" elapses.

When the reference time is updated (that is, when reference time t is updated to reference time t+24H), the first management information illustrated in FIG. 7 is updated to the first management information illustrated in FIG. 8, for example. When the first management information illustrated in FIG. 7 is compared with the first management information illustrated in FIG. 8, the valid terms managed in the first management information have each been shifted by 24 hours. That is, for the valid term information "0H to 24H" included in the first management information in association with management area information "N3", for example, it is identified that the valid term has elapsed due to the reference time being updated (that is, due to 24 hours having elapsed), and this valid term information is updated to valid term information "-". When the valid term information is updated to "-", the data stored in the management area indicated by the management area information included in the first management information in association with the valid term information is collectively erased, and the management area is used as a buffer zone, for example.

Meanwhile, for the valid term information "24H to 48H" included in the first management information in association with management area information "4N", for example, the valid term is shortened in response to the reference time being updated, and the valid term information is updated to "0H to 24H". In other words, the valid term "24H to 48H" assigned to the management area indicated by management area information "4N" is updated to "0H to 24H" based on the fact that the valid term "0H to 24H" indicated by the valid term information included in the first management information in association with management area information "N3" has elapsed.

Note that, although valid terms (information) managed in the first management information are described here as being updated in response to the reference time being updated, the management areas (information) managed in the first management information may also be updated in response to the reference time being updated.

Furthermore, as long as the correspondence between the management areas and the valid terms assigned to the management areas can be managed as mentioned above, the data structure of the first management information may be a structure other than that illustrated in FIGS. 7 and 8.

More specifically, the first management information may, as illustrated in FIG. 9, have a data structure that further includes an order (sequential order) in association with the management area information and valid term information. According to the first management information illustrated in FIG. 9, it can be seen that a term of up to 24 hours after the reference time (that is, an initial 24H term) is assigned, as a valid term, to the management area indicated by management area information "N3" associated with order "1". Similarly, it can be seen that the management area indicated by management area information "N4" associated with order "2" is the management area which is disposed next after the management area indicated by management area information "N3" from a valid term standpoint, and that the term from 24 hours up to 48 hours after the reference time (that is, the second 24H term) is assigned to this management area as a valid term. According to this first management information, by reducing the order by one at a time whenever the reference time is updated, it is possible to suitably manage the management areas to which each of the valid terms have been assigned.

Figures 10, 11:
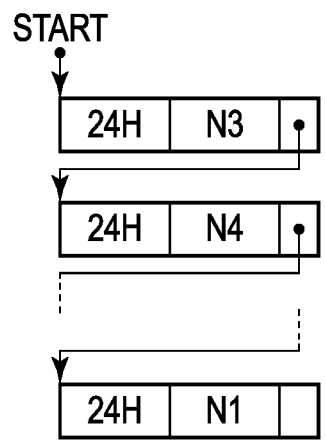
FIG. 10 is a diagram illustrating yet another example of the first management information.
FIG. 11 is a diagram illustrating an example of the first management information when write start addresses are managed.

The first management information illustrated in FIG. 9 is illustrated in table format, but the first management information may also be in a format such as the order list illustrated in FIG. 10, for example. Note that the first management information illustrated in FIGS. 9 and 10 represents roughly the same content as the aforementioned FIG. 7.

Furthermore, according to this embodiment, when data is written to one management area, for example, the data is written to the management area so as to be additionally written starting at the end of data which has already been written to the management area (that is, additional writing is performed with respect to the management area). Hence, the starting points for subsequent writing to each management area (appearing hereinbelow as the "write start addresses") are preferably managed in the storage device 10. In this case, the write start addresses may also be included in the first management information as illustrated in FIG. 11. When a write start address "A1" is included in the first management information in association with management area information "N1" as per the example illustrated in FIG. 11, the data which is written next to the management area indicated by management area information "N1" may be written from an address "A1".

Note that, although not illustrated, (information on) the sizes of the management areas, and the like, may also be managed in the first management information.

The operation of the storage device 10 according to this embodiment will be described hereinbelow. First, an example of a processing procedure for processing when writing data (appearing hereinbelow as "write processing") to a non-volatile memory 12 will be described with reference to the flowchart of FIG. 12. Note that data which is written to the non-volatile memory 12 is referred to as target data in the following description.

Here, according to this embodiment, based on the premise that the foregoing first management information is managed in the storage device 10, the storage device 10 is described as operating as a key-value store (KVS)-type storage device.

First, the control unit 11 (controller 101) receives a write request from the host, for example (step S1). The write request received in step S1 includes target data (data to be written to the non-volatile memory 12) and a key which corresponds to an index when reading/writing the target data (a key assigned to the target data). Note that, according to this embodiment, a valid term is set for target data included in a write request.

When the processing of step S1 is executed, the control unit 11 checks the validity of the write request received in step S1 (step S2). In step S2, it is checked whether or not target data and a key are included in the write request, whether or not the key matches a predetermined format, and whether or not the valid term which has been set for the target data is valid, and so forth. Through execution of the processing of step S2, the control unit 11 determines whether or not the write request received in step S1 has validity (step S3).

When it is determined that the write request has validity (YES in step S3), the area determination unit 11a included in the control unit 11 executes processing to determine the write destination (appearing hereinbelow as "write destination determination processing") for the target data included in the write request received in step S1 (step S4). In the write destination determination processing, the management area to which the target data is to be written is determined from among the plurality of management areas obtained by logically partitioning the storage area of the non-volatile memories 12 as mentioned above. Note that the details of the write destination determination processing will be described subsequently.

When the processing of step S4 is executed, the target data is written to the management area determined in step S4 (that is, the write destination) (step S5)

Here, in the case of the aforementioned KVS-type storage device 10, a key is designated when reading the target data. That is, because a host application (the host) does not designate an address corresponding to the "location" in which the target data is written to the storage device 10, the correspondence between the key and the address to which the target data to which the key has been assigned is actually written must be managed within the storage device 10.

Hence, when the processing of step S5 is executed, the control unit 11 updates the second management information (information management table) stored in the aforementioned volatile memory 13 (DRAM 103) (step S6). Note that the second management information is information for managing a data storage destination (write destination) in the storage device 10 (non-volatile memory 12). By updating the second management information in this way, a state is assumed where the target data can be read normally in the subsequent read processing. Note that the specific data structure of the second management information will be described subsequently.

When the processing of step S6 is executed, a response indicating that the processing of the write request (that is, the processing to write the target data to the non-volatile memory 12) has been executed normally (normal response) is sent back to the host in response to the write request received in step S1 (step S7).

Note that, although not illustrated in FIG. 12, when the write start addresses are managed in the first management information, the write start address included in the first management information in association with (the management area information indicating) the management area is updated as a result of the target data being written to the management area determined in step S4.

On the other hand, when the aforementioned write request is determined to not have validity (NO in step S3), a response indicating that the processing of the write request (that is, processing to write the target data to the non-volatile memory 12) has not been executed normally (error response) is sent back to the host in response to the write request (step S8).

Next, an example of a processing procedure for the aforementioned write destination determination processing (the processing of step S4 illustrated in FIG. 12) will be described with reference to the flowchart in FIG. 13. The write destination determination processing illustrated in FIG. 13 is executed by the area determination unit 11a included in the control unit 11 as mentioned above.

First, the area determination unit 11a acquires the valid term which has been set for the target data included in the write request received in step S1 illustrated in FIG. 12 (step S11).

Thereafter, the area determination unit 11a refers to the first management information stored in the volatile memory 13 (DRAM 103) to retrieve valid term information indicating the valid term which includes the end time of the valid term acquired in step S11 (appearing hereinbelow as the "applicable valid term information") (step S12). Note that the end time of the valid term acquired in step S11 is, for example, a time (current time) obtained by adding the valid term to the time (date and time) when the write request is received in step S1 illustrated in FIG. 12.

The area determination unit 11a determines, based on the results of the processing of step S12, whether or not the first management information has the applicable valid term information (an entry for the valid term acquired in step S11) (step S13).

Upon determining that the first management information has the applicable valid term information (YES in step S13), the area determination unit 11a acquires the free capacity of the management area (appearing hereinbelow as the "target management area") indicated by the management area information included in the first management information in association with the applicable valid term information (step S14).

Note that the free capacity of the target management area can be acquired based on the size (capacity) of the target management area and on the size and so forth of the data already written to the target management area. Furthermore, the free capacity of the target management area may also be acquired by using the write start address or the like of the target management area, for example.

Thereafter, the area determination unit 11a determines, based on the free area of the target management area acquired in step S14, whether or not target data can be written to the target management area (step S15). In step S15, the size of the target data is compared with the free capacity of the target management area acquired in step S14, and it is determined that the target data can be written when the size of the target data is smaller than the free capacity of the target management area. On the other hand, when the size of the target data is greater than the free capacity of the target management area, it is determined that the target data cannot be written.

When it is determined that the target data can be written to the target management area (YES in step S15), the area determination unit 11a determines the target management area as the write destination for the target data (step S16).

On the other hand, when it is determined that the first management information does not have the applicable valid term information (NO in step S13) or when it is determined that the target data cannot be written to the target management area (NO in step S15), an error response is sent back as a response to the write request from the host (step S17).

According to the aforementioned write destination determination processing, the management area which has been assigned the valid term (corresponding to the valid term) set for the target data can be determined as the write destination for the target data.

Here, it is described that, in the aforementioned write destination determination processing illustrated in FIG. 13, an error response is sent back in a case where it is determined that the first management information does not have the applicable valid term information and in a case where it is determined that the target data cannot be written to the target management area. The number of times the error response is sent back is preferably reduced.

An example of a processing procedure for write destination determination processing in which the number of times an error response is sent back is reduced will be described hereinbelow with reference to the flowchart of FIG. 14.

First, the processing of steps S21 to S26, which corresponds to the aforementioned processing of steps S11 to S16, is executed.

Here, when it is determined that the first management information does not have the applicable valid term information in step S23 (NO in step S23) or when it is determined that the target data cannot be written to the target management area (NO in step S25), the area determination unit 11a designates all the valid term information (that is, an aggregate of all valid management areas) that exists in the first management information as "S" (step S27).

Next, the area determination unit 11*a* designates, in S, the management area with the longest valid term (that is, the management area indicated by the management area information included in the first management information in association with the valid term information indicating the valid term farthest from the reference time) as "A" (step S28).

When the processing of step S28 is executed, the area determination unit 11*a* acquires the free capacity of A (step S29). Note that the processing of step S29 is processing like the aforementioned processing of step S24.

The area determination unit 11*a* determines, based on the free area of A acquired in step S29, whether or not the target data can be written to A (step S30). Note that the processing of step S30 is processing like the aforementioned processing of step S25.

When it is determined that the target data can be written to A (YES in step S30), the area determination unit 11*a* determines A as the write destination for the target data (step S31).

On the other hand, when it is determined that the target data cannot be written to A (NO in step S30), (a set of) management areas obtained by excluding A from S are designated as a new S (step S32).

When the processing of step S32 is executed, the area determination unit 11*a* determines whether or not S exists (step S33).

When it is determined that S exists (YES in step S33), the processing is repeated by returning to step S28.

On the other hand, when it is determined that S does not exist (NO in step S33), an error response is sent back in response to the write request from the host (step S34).

Figure 14:
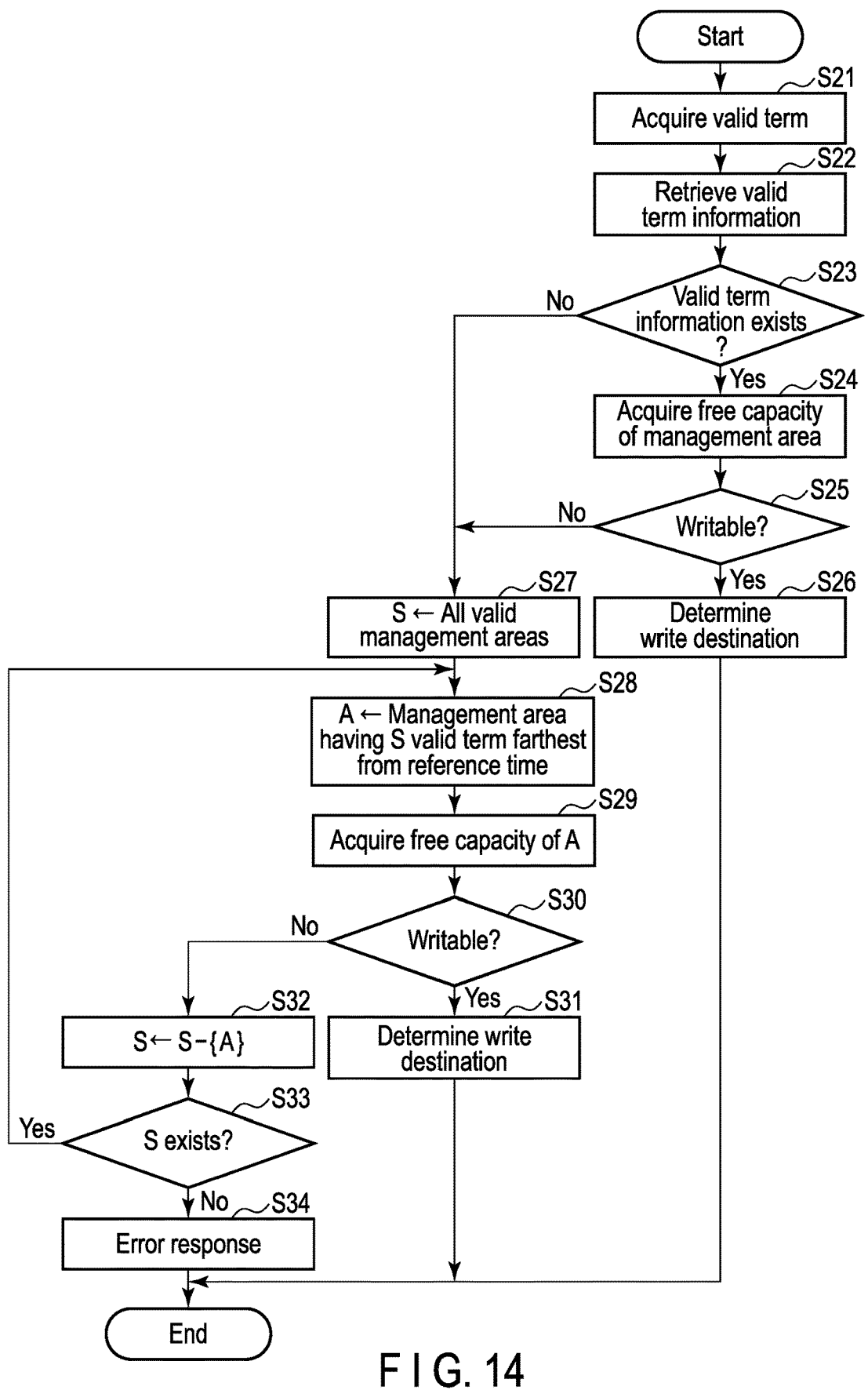
FIG. 14 is a flowchart illustrating another example of a processing procedure for write destination determination processing.

As mentioned above, in the write destination determination processing illustrated in FIG. 14, even when the applicable valid term information (the valid term information indicating the valid term including the end time of the valid term which has been set for the target data) does not exist in the first management information or even when the target data cannot be written to the target management area (the management area indicated by the management area information included in the first management information in association with the valid term information indicating the valid term), it is determined, from the longest to the shortest valid terms, whether or not the target data can be written to the selectable management areas (the management areas indicated by the management information included in the first management information), and the target data can be written to a management area to which it has been determined that the target data can be written.

Figure 15:
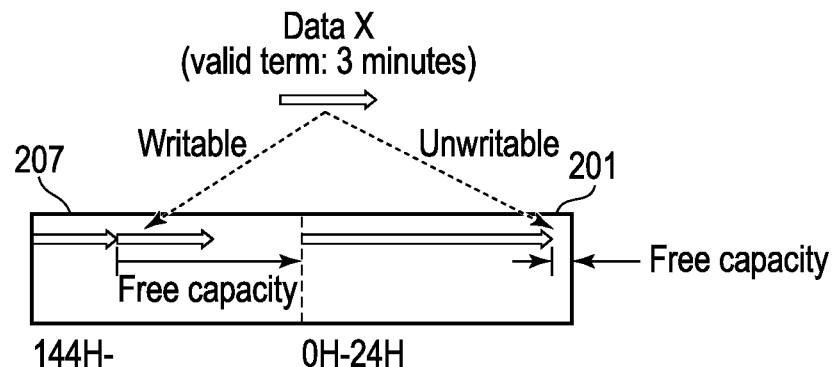
FIG. 15 is a diagram illustrating a specific example of write destination determination processing.

Note that FIG. 15 illustrates a specific example of the write destination determination processing illustrated in FIG. 14. In the example illustrated in FIG. 15, it can be seen that, when there is no free capacity enabling the writing of target data X to management area 201 (the management area assigned to the valid term 0H to 24H), management area 207 (the management area to which the valid term beyond 144H is assigned) can be determined as the write destination for the target data X. Accordingly, the valid term which has been set for the target data is guaranteed while making it possible to reduce the number of times an error response is sent back.

Furthermore, in the write destination determination processing illustrated in FIG. 14, in cases where the valid term which has been set for the target data is subject to a large bias or where there are multiple write requests including target data for which a valid term has not been set, or the like, for example, it is possible that a management area to which a specific valid term has been assigned will be used more than necessary. Hence, an area to which data is written through the processing of step S27 and subsequent steps, which are illustrated in FIG. 14 (appearing hereinbelow as "error-mapping area"), may also be restricted in each of the management areas. In this case, the processing of steps S29 and S30 may be executed by using the error-mapping area in A as the target. The error-mapping area in each management area may be fixed or may be dynamically changed according to the usage status of the management area.

Further, when there is a management area to which a valid term has not been assigned as mentioned above (a buffer zone), the management area may also be used as an error-mapping area. That is, the target data may also be written to a management area to which a valid term has not been assigned.

Here, although, in the write destination determination processing illustrated in FIG. 14, it is described that a management area having a long valid term is preferentially determined as a write destination for the target data, the management area with the largest free capacity may be determined as the write destination, for example, or a management area which has been assigned a valid term close to the valid term set for the target data may be determined as the write destination. Furthermore, a management area with a low write frequency and a low read frequency may also be determined as the write destination for the target data.

That is, according to this embodiment, the write destination for target data only has to be determined based on at least one of the valid terms assigned to each of the plurality of management areas, the free capacity of the management areas, and the write frequency and the read frequency to/from the management areas. Note that the write frequency and read frequency of each management area are managed in the storage device 10 according to the execution of the write processing and read processing.

The quantity and size of the target data stored in the other management areas which could not be written to the management area (the specified management area) which has been assigned the valid term set for the target data as mentioned above can be ascertained in the storage device 10, and could also be suitably ascertained by the user or administrator of the storage device 10, or by a host (software running thereon) that issues various requests to the storage device 10. Accordingly, measures can be taken such as enlarging the size of the management areas to which the target data stored to the other management areas which could not be written to the specified management area (that is, data of a different valid term) is frequently written or, as described subsequently, reducing the size of the management areas with a lot of unused area (area in which data has not been written) when data is to be erased.

Note that processing to write the target data included in a write request to a plurality of different management areas is not executed. In other words, processing to store only a portion of the target data reported in one write request to different management areas is not performed.

However, when the size of the target data is greater than one management area, for example, the target data may be written (saved) to the management area which has been assigned the valid term set for the target data and to one or more management areas other than this management area. The management areas other than the specified management area in this case can be determined through processing such as the processing of step S27 and subsequent steps illustrated in FIG. 14, for example. When only a portion of the target data is to be written to a separate area as mentioned above, this data must be managed (saved) together with meta-information to maintain the correspondence of target data (fragments) written to different management areas. This meta-information may be managed by being additionally written at the end of normal data or by adding a special field to second management information, or the like, for example.

Note that, when there is no need to write all the target data, the target data may be partitioned so that only a portion of the target data is written.

Although it is described, in the aforementioned write destination determination processing illustrated in FIG. 14, that the target data is written to unused area (area in which data has not been written) without making changes to already written data, an area for writing the target data may be allocated in the management area assigned to the valid term which has been set for the target data (already written data is overwritten with the target data), for example. Thus, there is no mixing of data of different valid terms beyond the range of the management area allocated in the storage device 10.

Here, an overview of the processing to allocate, in the management area, an area for writing target data will be described with reference to FIG. 16.

A case is assumed here in which L represents the size of target data X and the valid term which has been set for the target data X is three minutes. Further, though the target data X, for which a three-minute valid term has been set, is to be written to the management area 201 assigned to the valid term (OH to 24H), the size of the free capacity of the management area 201 is L' (<L). In this case, because the target data X cannot be written to the free area of the management area 201, an area that corresponds to a value obtained by subtracting the size L' of the free area from the size L of the target data X (that is, the size L-L' of the target data which cannot be written to the management area 201 at the current moment) is allocated in the management area 201. More specifically, data which has been written to an area having an erase unit size exceeding the size L-L' is erased from the beginning of the management area 201. Accordingly, a front portion of target data X (a portion of the target data X) can be written to the free area (size L') of management area 201, and a rear portion of the target data X (the remainder of the target data X) can be written to the area (an erase unit size exceeding L-L') allocated by erasing the data. Note that, when the data written from the beginning of management area 201 is data which is managed according to a plurality of erase unit sizes, data that corresponds to a size which is an integer multiple of the erase unit size may be erased.

Figure 16:
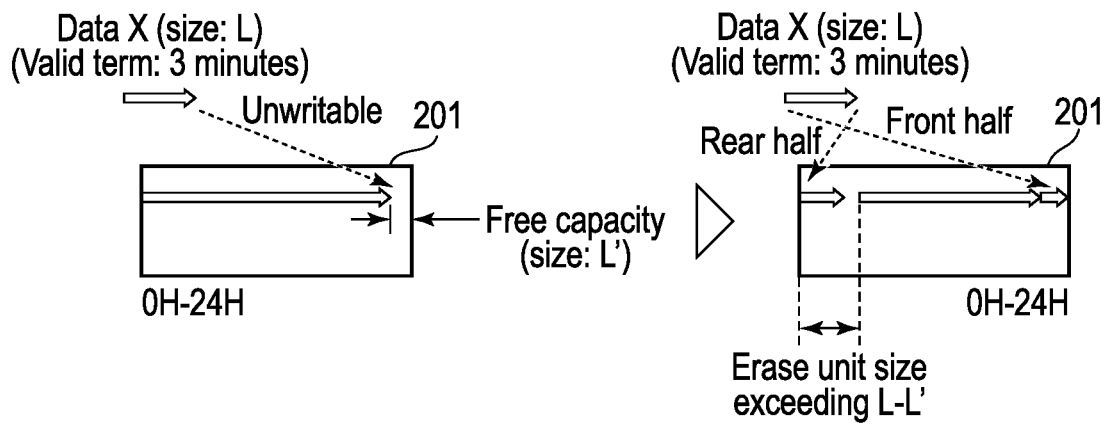
FIG. 16 is a diagram providing an overview of processing to allocate an area for writing data, in a management area.

When data which has been written to management area 201 is erased as described in FIG. 16, such processing is executed together with processing to remove, from the second management information, the correspondence (that is, the corresponding entry) between the location where the data is written (the write destination of the data) and the key assigned to the data. By removing the corresponding entry from the second management information in this way, an error response such as "no values have been stored (data has already been erased)" can be sent back even if an external application (the host) has requested reading.

Note that, in this embodiment, a case is assumed where the storage device 10 is used on a cache server or the like. In this case, even if the data (cache) stored in the storage device 10 has been erased, because the data itself is managed on a different server device or the like, the data erasure is not considered to be problematic.

Here, when data which has already been written to the management area is erased as mentioned above, although the corresponding entry is described as being removed from the second management information, the removal of the corresponding entry is similarly executed even in cases where, depending on the circumstances of the storage device 10, there is no other option but to erase data which has already been written to the management area (saved data), as in cases where the size of the management area is to be changed or where it is difficult to read data due to degradation of the non-volatile memory 12 (storage element), for example. Operation in which a conflict does not arise for the storage system that includes the storage device 10 is thus made possible.

Note that a configuration may also be implemented in which, when data has been erased due to the circumstances of the storage device 10, the erased data is reported in advance to the host (or to an application running on the host). In this case, the erased data may be reported by using a specific message (command) to interrupt the host, or may be reported as additional information in a response to another request. Thus, because changes in the state of the storage device 10 can be rapidly ascertained on the host side, the valid term information managed by the application running on the host can be suitably updated.

Next, an example of a processing procedure for processing when reading data from the non-volatile memory 12 (appearing hereinbelow as "read processing") will be described with reference to the flowchart of FIG. 17. Note that data which is read from the non-volatile memory 12 is referred to as target data in the following description.

First, the control unit 11 (controller 101) receives a read request from the host, for example (step S41). The read request received in step S41 includes a key which is assigned to the target data (the data to be read from the non-volatile memory 12).

When the processing of step S41 is executed, the control unit 11 checks (checks) the validity of the read request received in step S41 (step S42). In step S42, it is checked whether or not the key included in the read request matches a predetermined format. Through execution of the processing of step S42, the control unit 11 determines whether or not the read request received in step S41 has validity (step S43).

When it is determined that the read request has validity (YES in step S43), the control unit 11 retrieves the key included in the read request (appearing hereinbelow as "target key") from the second management information stored in the volatile memory 13 (step S44).

Figure 18:
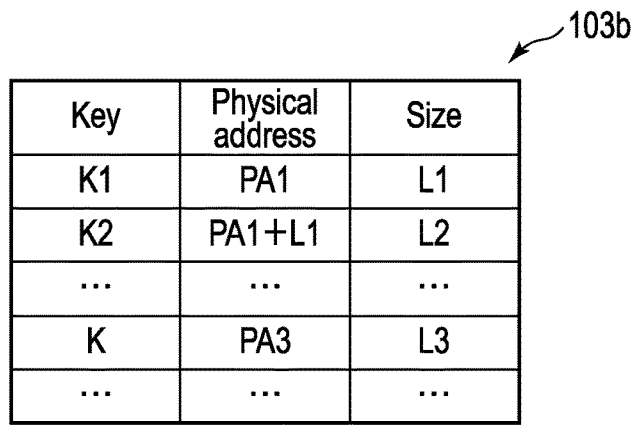
FIG. 18 is a diagram illustrating an example of second management information.

Here, FIG. 18 illustrates an example of the data structure of the second management information. As illustrated in FIG. 18, according to the second management information, correspondence between the key assigned to the data, the physical address corresponding to the location where the data is written, and the size of the data is managed for each data item written to the non-volatile memories 12 (management areas).

In the example illustrated in FIG. 18, the second management information includes and associates a key "K1", a physical address "PA1", and a size "L1" with one other, for example. Thus, it can be seen that the physical address at which the data to which key "K1" is assigned has been written is PA1, and the size of the data is L1.

The second management information includes and associates a key "K2", a physical address "PA1+L1", and a size "L2" with one other, for example. Thus, it can be seen that the physical address at which the data to which key "K2" is assigned has been written is PA1+L1 (that is, the physical address corresponding to the end of the data of size L1 written from the physical address "PA1"), and the size of the data is L2.

Note that, in addition to the foregoing, correspondence between the key, physical address, and size is managed, in the second management information, for all the data written to the management areas.

Returning once again to FIG. 17, the control unit 11 determines, based on the results of executing the processing of step S44, whether or not the second management information has a target key (step S45).

Upon determining that the second management information has a target key (YES in step S45), the control unit 11 reads, from the non-volatile memory 12, target data of a size associated with the target key, based on the physical address associated with the target key in the second management information (step S46). In this case, the target data read from the non-volatile memory 12 is sent back to the host as a normal response (success response) to the read request received in step S41.

On the other hand, upon determining that the aforementioned read request has no validity (NO in step S43) or upon determining that the second management information has no target key (NO in step S45), the control unit 11 sends back, to the host, a response indicating that processing of the read request (that is, processing to read target data from the non-volatile memory 12) has not been executed normally (error response) (step S47). That is, even when the (target key included in the) read request is valid, for example, an error response is sent back when the second management information does not have the target key (that is, the appropriate entry). At the time of such read processing, the storage device 10 acts like a simple database and may only send back responses.

Note that the configuration may also be such that the valid term of the target data is checked at the time of read processing. In this case, the second management information only has to be configured to further include information indicating valid terms (valid term information). However, because information on correct valid terms is typically managed on the host application (host) side, the storage device 10 need not necessarily be configured to check valid terms.

Here, in FIG. 18 above, a case is illustrated in which keys, physical addresses, and sizes are included in the second management information, and a case is assumed in which physical addresses spanning across management areas are uniquely set in the second management information (that is, it is possible, based on a physical address, to uniquely specify a management area and the location where data in the management area is written).

Figure 19:
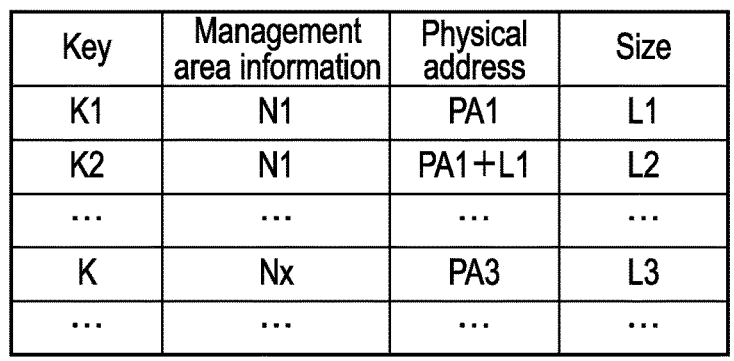
FIG. 19 is a diagram illustrating another example of the second management information.

That is, when, for example, a physical address is reassigned to every management area (although it is possible to specify a location where data is written in one management area, the management area cannot be specified using only the physical address), second management information, which further includes information (management area information) on the management areas where data to which keys have been assigned is written, must be managed as illustrated in FIG. 19.

Figure 20:
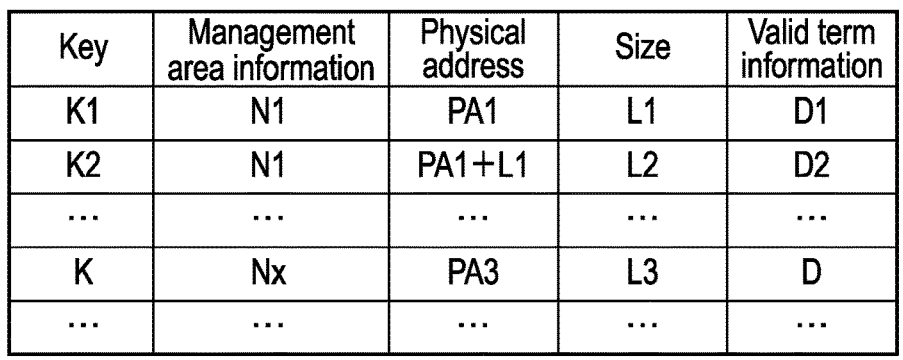
FIG. 20 is a diagram illustrating yet another example of the second management information.

Furthermore, when the second management information includes information indicating valid terms (valid term information), the second management information only has to be that illustrated in FIG. 20.

Next, the processing when erasing data from the non-volatile memory 12 (appearing hereinbelow as "erase processing") will be described with reference to the flowchart of FIG. 21. Note that the erase processing illustrated in FIG. 21 is executed using the timing for updating (valid term information managed in) the aforementioned first management information, for example, but may also be executed using different timing.

First, as a result of the first management information being updated, the control unit 11 retrieves, from the first management information, a management area (appearing as "erase area" hereinbelow) having data for which the valid term has elapsed (step S51).

The control unit 11 determines, based on the results of the processing of step S51, whether or not there is an erase area (step S52).

Here, a case is assumed where the aforementioned first management information illustrated in FIG. 7 is updated to the first management information illustrated in FIG. 8 as a result of 24 hours elapsing since the reference time. In this case, because the valid term "0H to 24H" associated with management area information "N3" is updated to "-", the management area indicated by the management area information "N3" corresponds to an erase area and, in step S52, it is determined that there is an erase area.

Upon determining that there is an erase area as mentioned above (YES in step S52), the control unit 11 collectively erases all the data which has been written (stored) to the erase area (step S53).

Note that an entry for each key managed in the second management information is removed at the moment when the valid term, which has been set for the data to which the key is assigned, has elapsed, but when a key which has been assigned to the data written to the erase area (that is, the erased data) exists (remains) in the second management information, processing to remove the entry corresponding to the key from the second management information is executed.

On the other hand, when it is determined that there is no erase area (NO in step S52), the processing illustrated in FIG. 21 is ended.

Note that the processing of step S53 may be executed immediately at the moment it is determined in step S52 that there is an erase area, or may be executed with the timing for the operation of a preset timer. Further, the processing of step S53 may be executed by avoiding periods when a large amount of write processing and read processing of data is being executed, or may be executed using timing that does not overlap with the timing when other data is erased in the storage device 10.

When data is to be erased, the control unit 11 executes processing to erase data from a specific management area (erase area). Because data is erased in block units in a case where the non-volatile memory 12 is a NAND flash memory 102, for example, processing to erase data from the blocks constituting the management area is executed.

Here, a case is described in which data written to a management area having an elapsed valid term is automatically erased using the timing with which (valid term information managed in) the first management information is updated, and processing to remove specific data in response to a request from the host (host application) can also be executed, for example.

An example of a processing procedure for removal processing when removing specific data in response to a request from the host will be described hereinbelow with reference to the flowchart illustrated in FIG. 22. Note that data which is removed from the non-volatile memory 12 is referred to as target data in the following description.

First, the control unit 11 (controller 101) receives a removal request from the host, for example (step S61). The removal request received in step S61 includes a key which is assigned to the target data (the data to be removed from the non-volatile memory 12).

When the processing of step S61 is executed, the control unit 11 checks the validity of the removal request received in step S61 (step S62). In step S62, it is checked whether or not the key included in the removal request matches a predetermined format, or similar. Through execution of the processing of step S62, the control unit 11 determines whether or not the removal request received in step S51 has validity (step S63).

When it is determined that the removal request has validity (YES in step S63), the control unit 11 retrieves the key included in the removal request (appearing hereinbelow as "target key") from the second management information stored in the volatile memory 13 (step S64).

The control unit 11 determines whether or not the second management information has a target key based on the results of executing the processing of step S54 (step S65).

When it is determined that the second management information has the target key (YES in step S65), the control unit 11 removes the physical address and the size which are associated with the target key (that is, the target key entries) from the second management information (step S66). When the processing of step S66 is executed, a normal response to the removal request received in step S61 is sent back to the host.

The removal processing is thus completed only through the processing of the second management information (the processing to remove the target key entries). That is, the processing to erase target data from the non-volatile memory 12 is not actually executed in the removal processing illustrated in FIG. 22, rather, erasure of the target data is realized through the erase processing illustrated in FIG. 21 above. As mentioned above, according to this embodiment, the processing to actually erase data from the non-volatile memory 12 is termed "erase processing", as distinguishable from processing to remove target key entries from the second management information to render a state where data cannot be read, which is termed "removal processing". The same is also true for the other embodiments hereinbelow.

In this embodiment, valid terms are described as being set for data written to the non-volatile memories 12, and examples of the valid terms which are set for the data are described here.

First, valid terms which are reported using a communications protocol when data is received via a network, for example (for instance, valid terms contained in an HTTP Cache-Control field) can be used as the valid terms.

The administrator of the storage device 10 may also use terms set in advance as the valid terms. In this case, valid terms may be set for each data type. More specifically, after classifying data into text data, image data, video data, and other such data types, for example, valid terms can be provided for each of these types. Moreover, valid terms may be set for every data size or segment (sizes S1 to S2, sizes S2 to S3, and so on).

Furthermore, the valid terms may be set in advance by the administrator for each data generation source (origin server or primary storage source) or each domain name.

Further, the valid terms may be set based on the costs required when acquiring data. In this case, when downloading data takes a long time, for example, it is possible to set a long valid term.

Note that, because the storage device 10 is unable to directly ascertain the aforementioned valid terms, the valid terms are reported to the storage device 10 by the host via the aforementioned write request, or the like, after being suitably ascertained on the host side (an application running thereon).

As mentioned above, according to this embodiment, in a case where a plurality of management areas, which are obtained by logically partitioning the storage area of a non-volatile memories 12, are managed and a write request is received that includes data for which a valid term has been set, one management area (a first management area) is determined, based on the valid term, from among the plurality of management areas, and the data included in the write request is written to the determined management area. Further, according to this embodiment, when data written to the management area is erased, all the data written to the management area which contains the data is collectively erased. More specifically, according to this embodiment, all the data written to the specific management area is collectively erased in response to the elapse of the valid term assigned to the management area.

Note that, according to this embodiment, non-overlapping valid terms are respectively assigned to a plurality of management areas, and the management area which has been assigned the valid term including the end time of the valid term set for the data included in the write request is determined as the data write destination.

Further, according to this embodiment, the plurality of management areas include a first management area to which a first valid term (0H to 24H, for example) is assigned, and a second management area to which a second valid term (24H to 48H, for example) longer than the first valid term is assigned, and when the first valid term assigned to the first management area has elapsed, the second valid term assigned to the second management area is updated (shortened) based on the first valid term.

According to this embodiment, because, as mentioned above, the configuration is such that different valid terms assigned to each of the plurality of management areas are suitably managed and all the data of a management area having an elapsed valid term is collectively erased, areas which have had data erased can be used effectively in comparison with a configuration with which erasure is executed in the units of the data written to the non-volatile memories 12. In other words, according to this embodiment, the occurrence of garbage collection (processing to release unnecessary storage area) within the non-volatile memories 12 can be suppressed, and the number of times of writing to the non-volatile memories 12 can be minimized. Thus, by suppressing the usage count of the non-volatile memories 12 (storage elements) used in the storage device 10, degradation of the non-volatile memories 12 can be suppressed.

Note that, according to this embodiment, data included in a write request is additionally written starting at the end of data already written to the management area (is additionally written at the end of the used portion of the management area). Accordingly, when writing data to a management area, it is possible to reduce the processing load involved in searching for an area to which the data can be written.

Further, according to this embodiment, when the free capacity (free area) of the management area, to which the valid term set for the data has been assigned, is inadequate, by writing a portion of the data to the free area of the management area and erasing other data which has been written to the beginning of the management area to secure capacity of a size enabling the other portion (remainder) of the data to be written, the other portion of the data can be written starting at the beginning of the management area.

Note that, when the free area of the management area, to which the valid term set for the data has been assigned, is inadequate, the data may also be written to another management area (for example, to a management area to which a longer valid term than this valid term has been assigned). The other management area to which this data is written is determined based on at least one of: the valid terms assigned to each of the plurality of management areas, the free capacity of the management areas, and the write frequency and read frequency of the management areas. Furthermore, when the free area of the management area, to which the valid term set for the data has been assigned, is inadequate, the data may also be written to a management area to which a valid term has not been assigned (a buffer zone).

Because such a configuration enables the error response count in the write processing to be reduced, frictionless write processing can be achieved.

Second Embodiment

A second embodiment will be described next. Although the storage device 10 is described in the first embodiment as operating as a KVS-type storage device, this embodiment differs from the first embodiment in that data management is performed using an address rather than KVS (data management using a key).

FIG. 23 is a block diagram schematically illustrating the configuration of the storage device according to this embodiment. Note that, in FIG. 23, the same reference signs are assigned to parts like those of FIG. 1 above, and a detailed description thereof is omitted. Here, those parts which differ from FIG. 1 will mainly be described.

As illustrated in FIG. 23, a control unit 11 in a storage device 10 according to this embodiment includes an address conversion unit 11b. The address conversion unit 11b is a function unit for converting an internal address specifying a location where data is written in the storage device 10 (non-volatile memories 12), and an external address for reporting to an external host. Note that, according to this embodiment, an internal address is a logical address which is managed in the storage device 10, and an external address is a logical address which is managed in the host.

According to this embodiment, third management information (address conversion information) for managing correspondence between an internal address and an external address for reporting to the host is stored in a volatile memory 13.

Note that, like the foregoing first embodiment, the volatile memory 13 does not need to be connected to the outside of the control unit 11. In this case, as illustrated in FIG. 24, the volatile memory 13 only has to be provided inside the control unit 11.

Next, an example of a processing procedure for write processing according to this embodiment will be described with reference to the flowchart illustrated in FIG. 25. Note that data which is written to the non-volatile memory 12 is referred to as target data in the following description.

First, the processing of steps S71 to S75, which correspond to steps S1 to S5 illustrated in FIG. 12 above, is executed.

Note that, although the write request received in step S1 illustrated in FIG. 12 above includes a key assigned to target data, and the target data, the write request received in step S71 includes only target data.

Furthermore, in step S75, although target data is written to the management area (that is, the write destination) determined in step S74, an external address (a logical address managed in the host), which corresponds to a logical address (an internal address) which is managed in the storage device 10 to which the target data is written, is generated by the control unit 11 so as to match the control on the host side.

Next, the address conversion unit 11b updates the third management information stored in the volatile memory 13 (step S76).

Figures 25, 26:
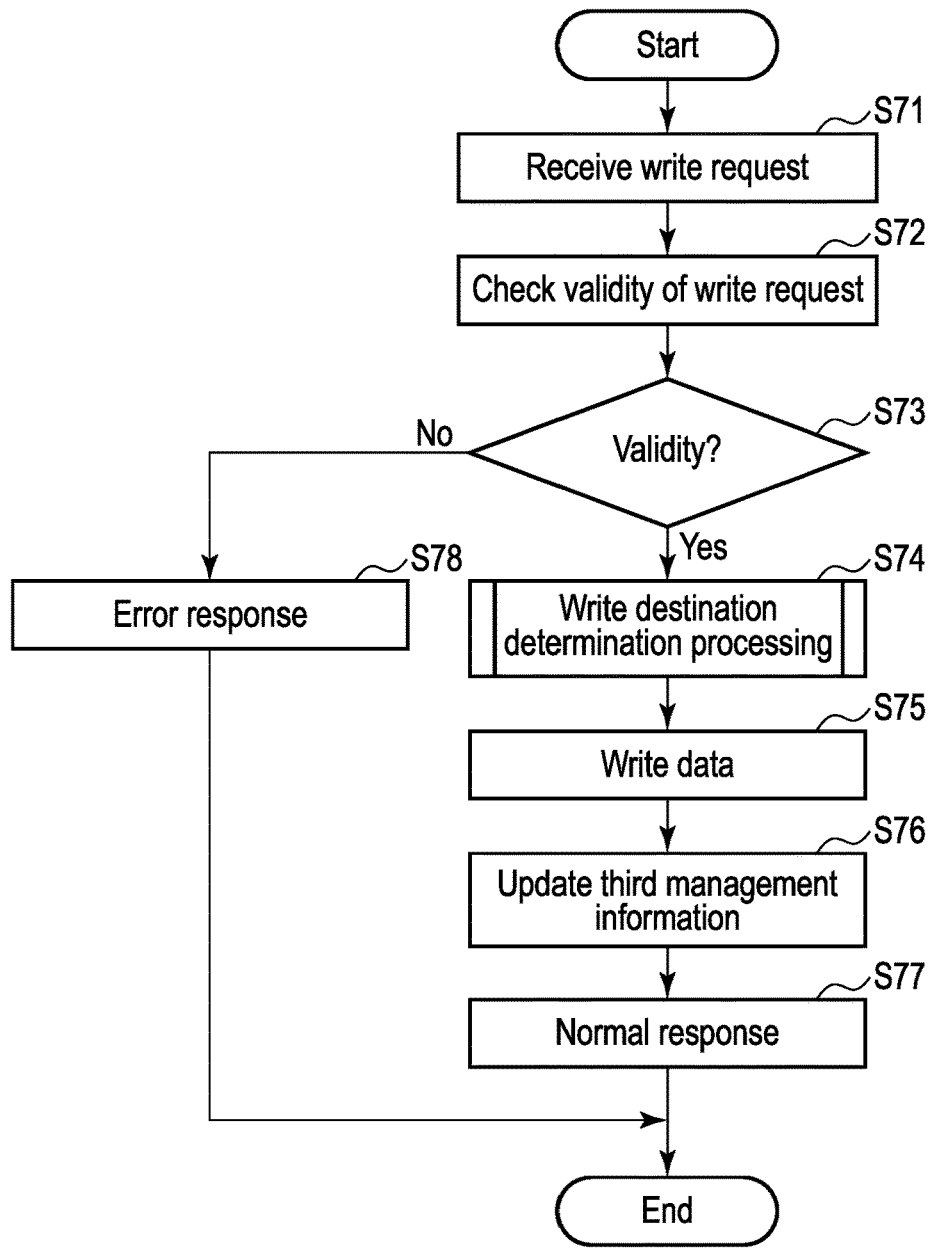
FIG. 25 is a flowchart illustrating an example of a processing procedure for write processing.
FIG. 26 is a diagram illustrating an example of third management information.

Here, FIG. 26 illustrates an example of the data structure of the third management information. As illustrated in FIG. 26, the third management information includes and associates internal addresses and external addresses with each other.

In the example illustrated in FIG. 26, the third management information includes and associates an internal address "F-LA1" with an external address "S-LA1". Accordingly, it can be seen that the data written to logical address "F-LA1" managed in the storage device 10 is managed as if same were written to the logical address "S-LA1" in the host.

Note that the third management information includes correspondence between an internal address and an external address for each data item written to the non-volatile memories 12 (management areas).

Using such third management information, the address conversion by the address conversion unit lib between internal addresses and external addresses can be realized.

Figures 27, 28:
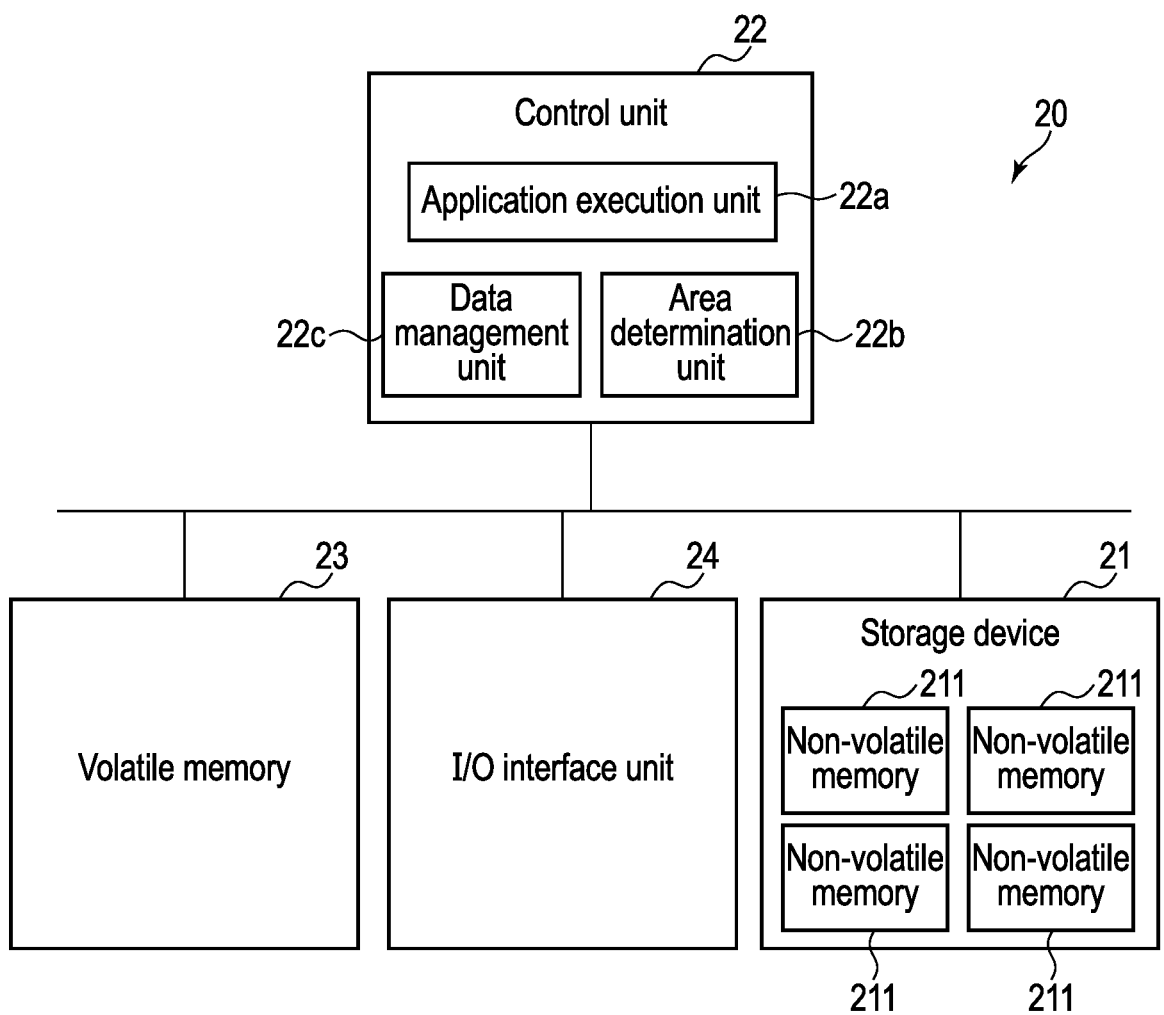
FIG. 27 is a diagram illustrating another example of the third management information.
FIG. 28 is a block diagram schematically illustrating an example of the configuration of a storage system according to a third embodiment.

Note that a case is assumed where the third management information illustrated in FIG. 26 uniquely defines internal addresses in the storage device 10. When an internal address is defined for each management area, management area information indicating the management area which corresponds to the internal address also only has to be included in the third management information, as illustrated in FIG. 27.

Returning once again to FIG. 25, in step S76, the third management information is updated by registering, in the third management information, the internal address to which target data is written in step S75 and an external address generated by the control unit 11 as mentioned above, in association with each other.

When the processing of step S76 is executed, in response to the write request received in step S71, a response indicating that the processing of the write request (that is, processing to write target data to the non-volatile memory 12) has been executed normally (normal response) is sent back to the host (step S77). Note that the normal response sent back to the host in step S77 includes an external address which has been registered in the third management information in step S76 above.

On the other hand, when it is determined in step S73 that the write request has no validity (NO in step S73), the processing of step S78 corresponding to the processing of step S8 illustrated in FIG. 12 above is executed. In this case, information indicating that the address is invalid (NULL or the like, for example) is sent back to the host as an error response.

Note that, although read processing and removal processing are also executed in this embodiment like the first embodiment, in the read processing and removal processing of this embodiment, an internal address and external address to which the target data is written only have to be employed instead of a key assigned to the target data.

More specifically, in the case of read processing, an external address to which target data is written and which is managed in the host is included in a read request from the host, and the target data is read based on an internal address which is obtained through conversion from the external address by referring to the third management information. In the case of removal processing, an external address to which target data is written and which is managed in the host is included in a removal request from the host, and correspondence between the external address and the internal address (that is, the corresponding entry) only has to be removed from the third management information. Note that the erase processing of this embodiment is the same as that of the first embodiment above.

As mentioned above, according to this embodiment, even in a case where the storage device 10 does not operate as a KVS-type storage device, but rather operates by using addresses to manage data, the usage count of the non-volatile memories 12 can be suppressed, thereby suppressing degradation of the non-volatile memories 12 as per the first embodiment above.

Note that, although, in this embodiment, it is described that an external address (logical address) is not reported to the storage device 10 by a host in write processing but, rather, an appropriate external address is generated on the storage device 10 side and reported to the host, the configuration may also be such that an external address, which is determined on the host side when writing data to the non-volatile memories 12, is reported to the storage device 10. In this case, correspondence between the external address reported by the host and the internal address (the logical address managed in the storage device 10) to which data is written only has to be managed in the third management information.

Third Embodiment

A third embodiment will be described next. Although a configuration is described in the first and second embodiments above in which management areas (the partitioned state and management status of the storage area of the non-volatile memories) do not need to be ascertained on the host side, this embodiment differs from the first and second embodiments in that the host manages the data written to the management areas. Note that, in this embodiment, a storage system in which the storage device and the host operate integrally is described.

FIG. 28 is a block diagram schematically illustrating the configuration of the storage system according to this embodiment.

As illustrated in FIG. 28, a storage system 20 includes a storage device 21, a control unit 22, a volatile memory 23, and an I/O interface unit 24.

The storage device 21 is provided with non-volatile memories 211 that correspond to the non-volatile memories 12 in the first and second embodiments above. Note that a controller or the like for controlling the operation of the storage device 21 is omitted from FIG. 28.

Note that, according to this embodiment, the storage device 21 is configured to be capable of partitioning the storage area of the non-volatile memories 211 into a plurality of management areas and of managing the data by storing the data in the plurality of management areas by means of additional writing.

The control unit 22 executes a predetermined application program and issues an I/O instruction for data writing and reading, or the like, to/from the storage device 21.

The volatile memory 23 is a memory device which is temporarily used by the application program executed by the control unit 22.

The I/O interface unit 24 includes a network interface, or the like, which is used when the control unit 22 exchanges data outside the storage system 20, for example. The I/O interface unit 24 may be an interface which is provided between the storage system 20 and a keyboard or mouse, or the like. Although there is a high likelihood of a plurality of interfaces being connected to the storage system 20, the same are represented in simplified form in FIG. 28.

Here, the control unit 22 includes an application execution unit 22a, an area determination unit 22b, and a data management unit 22c.

The application execution unit 22a is a function unit for executing the aforementioned application program.

The area determination unit 22b is a function unit for determining an area (management area) in the storage device 21 to which data is written.

The data management unit 22c is a function unit for managing information about the write destination (storage destination) of data when the data is written to the storage device 21.

Note that the aforementioned application execution unit 22a, area determination unit 22b, and data management unit 22c may also be realized by software executed by a generic processor (computation unit) such as a CPU mounted in the control unit 22.

Next, an example of the operation of the storage system 20 according to this embodiment will be described. Here, in a case where an application program, which issues I/O instructions for data writing and reading to/from the storage device 21, or the like, as mentioned above, is executed in the application execution unit 22a, the application program is described as using a KVS program. The KVS program is a program that runs in order to manage data by using a key which has been assigned to the data. Note that the aforementioned area determination unit 22b and data management unit 22c included in the control unit 22 are function units which are realized through execution of this KVS program.

Figure 29:
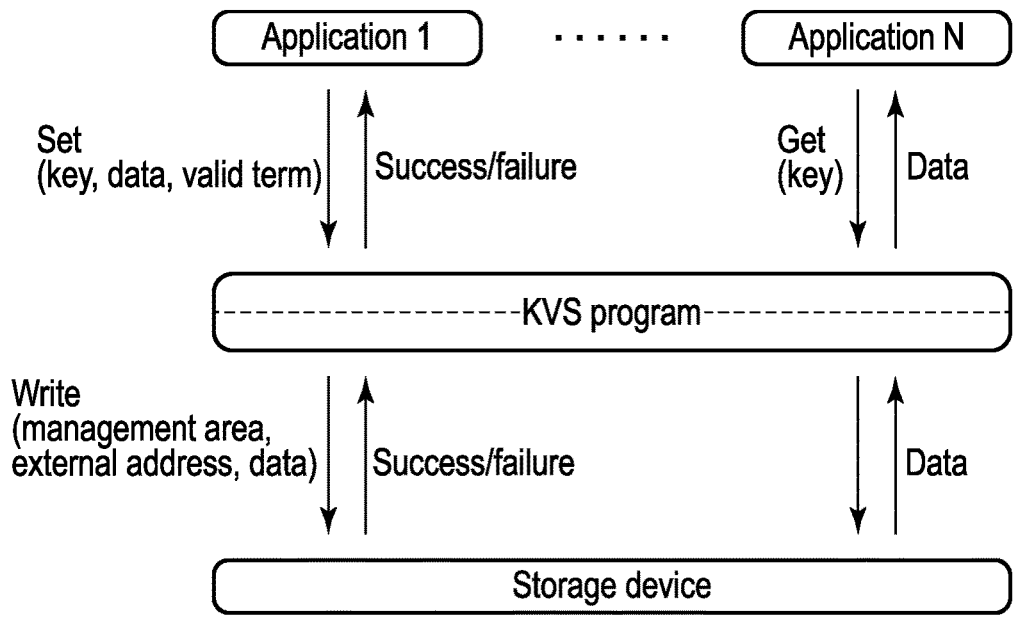
FIG. 29 is a diagram to illustrate an example of the operation of the storage system.

First, as illustrated in FIG. 29, when an application (program) 1, which is executed in the application execution unit 22a, executes the writing (setting) of data with respect to the storage device 21, the valid term which has been set for the data is reported to the KVS program by the application 1 in addition to the data and the key assigned to the data.

In this case, the KVS program determines an appropriate management area (write destination) based on the valid term reported by the application 1, and executes processing to write the data to the storage device 21. Processing to determine the data write destination is executed by the area determination unit 22b. Because this processing is as described in the first embodiment above, a detailed description thereof is omitted here.

Note that, when the storage device 21 provided to the storage system 20 according to this embodiment provides an interface that uses addresses, and when the control unit 22 is required to perform control to carry out additional writing, the KVS program designates the management area which has been determined as a write destination, and an external address (a logical address managed in the host) to which data is to be written, and writes the data to the storage device 21.

A response regarding whether the data write processing has succeeded or failed is sent back from the storage device 21 to the KVS program, and the response is sent back from the KVS program to the application 1.

On the other hand, when an application (program) N executed in the application execution unit 22a executes the reading (getting) of data with respect to the storage device 21, the key assigned to the data is reported to the KVS program by the application N.

In this case, the KVS program reads data from the storage device 21 by designating the key reported by the application N, an external address to which the data which has been assigned this key is written and which is managed in the KVS program (the host), and the size of the data. Data which is thus read from the storage device 21 is sent back to the application N.

Note that the correspondence between the aforementioned key assigned to the data, the management area serving as the write destination of the data, the external address to which the data is written, and the size of the data, and so forth, is also managed by the KVS program.

Figure 30:
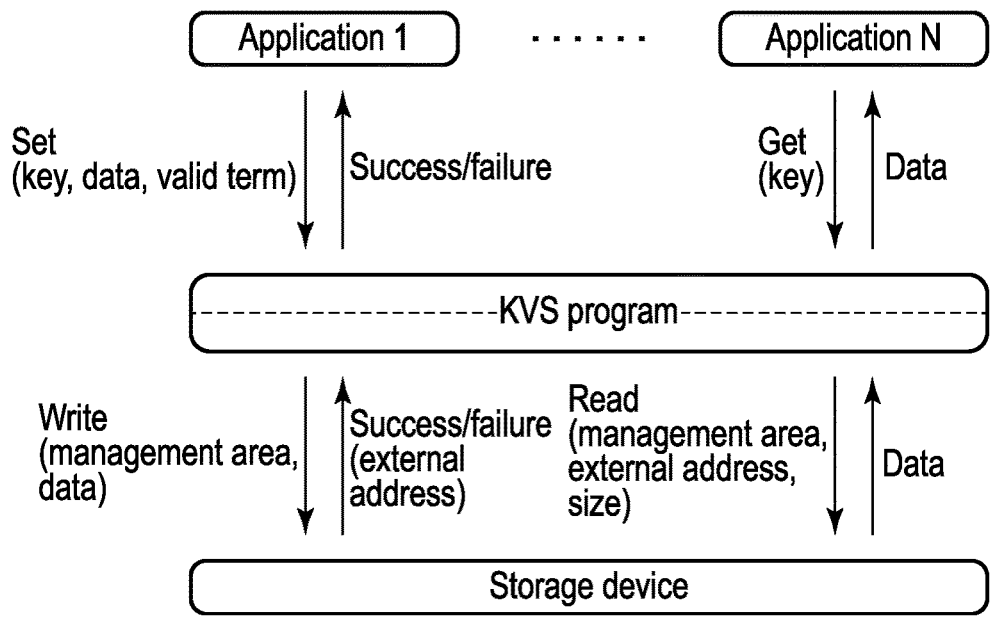
FIG. 30 is a diagram illustrating another example of the operation of the storage system.

Although FIG. 29 illustrates a case where the control unit 22 performs control to carry out additional writing, a configuration in which the additional writing is performed autonomously on the storage device 21 side is also possible. In this case, as illustrated in FIG. 30, the KVS program only has to write data to the storage device 21 by designating a management area (a write destination) and receive, from the storage device 21 as a result of the write processing, an external address to which the data is written and which is managed by the KVS program.

Figures 31, 32, 33:
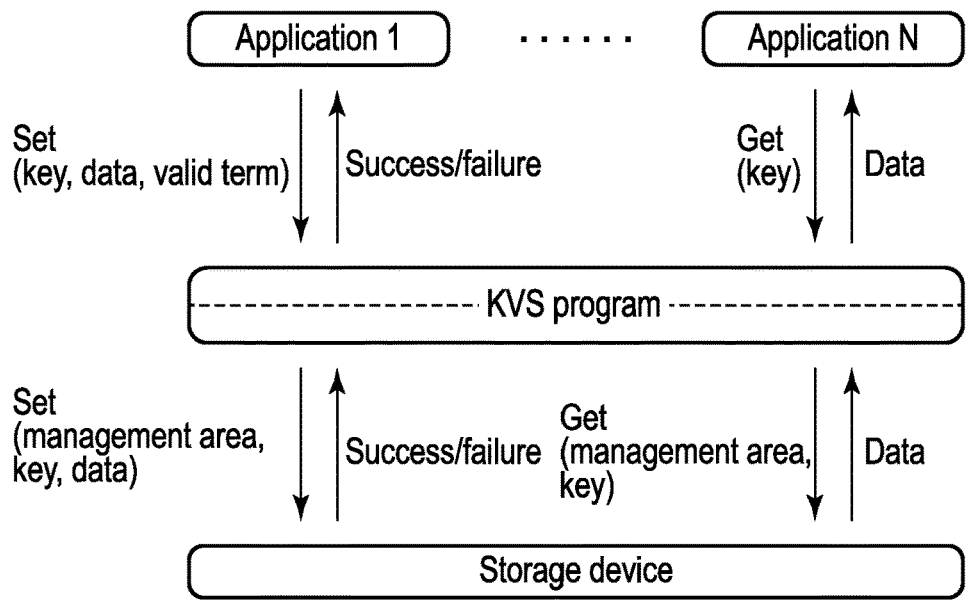
FIG. 31 is a diagram illustrating yet another example of the operation of the storage system.
FIG. 32 is a diagram illustrating an example of fourth management information.
FIG. 33 is a diagram illustrating an example of fifth management information.

Furthermore, when the storage device 21 provides a KVS interface, the KVS program only has to be configured to write data to the storage device 21 by designating a management area and a key, as illustrated in FIG. 31.

When, as mentioned above, the control unit 22 (host) manages the (storage area of the) non-volatile memories 211 in the storage device 21, a plurality of processing methods may be considered, depending on the embodiment of the storage device 21. In this case, the information to be managed in the data management unit 22c may also differ depending on the embodiment (processing method) of the storage device 21.

When the storage system 20 operates as illustrated in FIG. 29 above, the data management unit 22c manages fourth management information for managing correspondence between keys, sizes, (valid term information indicating) valid terms, (management area information indicating) management areas, and external addresses, as illustrated in FIG. 32, and fifth management information for managing the next write start address for each management area, as illustrated in FIG. 33. Note that, the valid term information managed in the fourth management information illustrated in FIG. 32 indicates valid terms which have been set for data to which corresponding keys have been assigned, and is not information indicating valid terms assigned to management areas where data has been written. Furthermore, in a case where external addresses are uniquely set across all areas, the management area information may also be omitted from the fourth management information.

The fourth and fifth management information as illustrated in FIGS. 32 and 33 are managed by the data management unit 22c in the same way as for a case where the storage system 20 operates as illustrated in FIG. 30. Note that, in the operation example illustrated in FIG. 30, because an external address is determined (reported by the storage device 21) when write processing succeeds, the external address managed in the fourth management information is added (registered) to the fourth management information after the write processing succeeds.

Furthermore, when the storage system 20 operates as illustrated in FIG. 31, information obtained by excluding the external address from the fourth management information illustrated in FIG. 32 only has to be managed by the data management unit 22c. That is, in the operation example illustrated in FIG. 31, because the storage device 21 has a built-in KVS interface, the data management unit 22c does not need to manage address-related information (external addresses or write start addresses).

Here, according to this embodiment, the area determination unit 22b included in the control unit 22 executes processing (write destination determination processing) to determine, based on the valid term which has been set for the data, the management area serving as the write destination of the data, and further includes functions for managing the management areas (appearing as "area management functions" hereinbelow). The area management functions include the creation, removal, and size modification of management areas, and the like.

For example, when the storage device 21 is in an initial state, management areas must be created. In this case, the (area management function of the) area determination unit 22b determines the number and sizes of the management areas and the breakpoints of valid terms (that is, the valid terms assigned to the management areas) via a predetermined program (an initialization program or the like) which is executed in the (application execution unit 22a included in the) control unit 22. The area determination unit 22b issues (transmits), to the storage device 21, a request to create each management area (an area creation command) based on the content thus determined.

When the storage device 21 executes processing corresponding to the area creation command issued by the area determination unit 22b, the area determination unit 22b receives a response to the area creation command from the storage device 21. If the response received from the storage device 21 is a normal response (that is, a response indicating that management areas have been created normally), the area determination unit 22b registers (adds) appropriate entries to the aforementioned first management information (that is, the correspondence between the created management areas and the valid terms assigned to the management areas). Note that, if the response received from the storage device 21 is an error response (that is, a response indicating that management areas have not been created normally), appropriate error processing is performed in the control unit 22.

Further, when, for example, the characteristics of the data handled by the storage system 20 according to this embodiment change significantly, the non-volatile storage area (management areas) of the storage device 21 must be reconstructed. In this case, the area determination unit 22b may issue a request to remove the management areas (an area removal command) to the storage device 21.

When the storage device 21 executes processing corresponding to the area removal command issued by the area determination unit 22b, the area determination unit 22b receives a response to the area removal command from the storage device 21. If the response received from the storage device 21 is a normal response (that is, a response indicating that management areas have been removed normally), the area determination unit 22b removes the appropriate entries from the first management information (that is, the correspondence between the removed management areas and the valid terms assigned to the management areas). Note that, if the response received from the storage device 21 is an error response (that is, a response indicating that management areas have not been removed normally), appropriate error processing is performed in the control unit 22. Also note that, similarly to a case where the sizes of the management areas are modified, a request to modify management area sizes (a size modification command) is issued by the area determination unit 22*b* to the storage device 21.

In addition, a case in which only sizes are modified while maintaining the number and order of the management areas is also possible. In a case where the storage device 21 handles such modification relating only to size, the sizes may be modified by issuing an appropriate request (command) to the storage device 21. In this case, the sizes of the management areas may be modified without considering the holding of the data written (saved) to the management areas, or only the unused area may be changed by taking into account (the capacity of) the data written to the management areas. Note that, when the sizes of the management areas are managed in the first management information, for example, the (corresponding entries in the) first management information is updated in response to a normal response from the storage device 21 (that is, a response indicating that the sizes of the management areas have been modified normally).

Next, an example of a processing procedure for write processing in the storage system 20 according to this embodiment will be described with reference to the flowchart illustrated in FIG. 34. Here, a case is assumed in which the storage system 20 operates as illustrated in FIG. 29. Note that, in the description hereinbelow, data which is written to the non-volatile memory 211 of the storage device 21 is referred to as "target data".

First, when a write request is generated due to an application program being executed in the application execution unit 22*a*, the control unit 22 acquires the write request (step S81). The write request acquired in step S81 includes target data and a key which is assigned to the target data. Valid terms are also set for the target data.

When the processing of step S81 is executed, the control unit 22 executes the processing of steps S82 to S84, which correspond to steps S2 to S4 illustrated in FIG. 12 above. Note that, when the storage system 20 operates as illustrated in FIG. 29 above, in step S84, a management area which is to serve as a write destination is determined, and the next write start address of the management area is acquired (determined) from the fifth management information.

Next, the control unit 22 issues, to the storage device 21, a write request that includes the (management area information indicating the) management area determined in step S84, an external address which is managed as being where the target data is written (a logical address managed in the host), and the target data (step S85). Note that the external address included in the write request is the same value as the aforementioned write start address.

When the processing of step S85 is executed, the writing of the target data is performed in the storage device 21 based on the write request issued in step S85, and a response to the write request is sent back from the storage device 21 to the control unit 22.

Here, the control unit 22 determines whether or not the response sent back from the storage device 21 is a normal response (step S86).

When it is determined that the response sent back from the storage device 21 is a normal response (YES in step S86), the data management unit 22*c* updates the aforementioned fourth and fifth management information based on the management area, the external address (write start address), and the target data, and the like, which are included in the write request issued to the storage device 21 in step S85 (step S87).

More specifically, in step S87, the key assigned to the target data, the size of the target data, and (the valid term information indicating) the valid term which has been set for the target data are registered in the fourth management information in association with (the management area information indicating) the management area and the external address which are included in the write request.

Further, in step S87, the next write start address of the management area included in the write request (that is, the fifth management information) is updated based on the size of the target data (that is, the target data written to the management area).

Note that, when the response sent back from the storage device 21 is a normal response as mentioned above (that is, when target data has been written to the storage device 21 normally), processing to update the aforementioned third management information (address conversion information) is executed in the storage device 21.

When the processing of step S87 is executed, a normal response is sent back to the application program executed in the application execution unit 22*a*, in response to the write request acquired in step S81.

On the other hand, when it is determined in step S83 that the write request has no validity (NO in step S83) or when it is determined that the response sent back from the storage device 21 in step S86 is not a normal response (that is, an error response) (NO in step S86), an error response is sent back to the application program executed in the application execution unit 22*a* in response to the write request acquired in step S81 (step S89).

Here, the write processing when writing data to the storage device 21 has been described here. Because the read processing and removal processing only have to be executed as per the write processing as in the first embodiment above, a detailed description thereof is omitted here.

Next, an example of a processing procedure for erase processing in the storage system 20 will be described with reference to the flowchart illustrated in FIG. 35. Note that the erase processing illustrated in FIG. 21 is executed using the timing for updating (valid term information held in) the first management information managed in the data management unit 22*c*, but may also be executed using different timing.

First, the control unit 22 executes the processing of steps S91 and S92, which corresponds to the processing of steps S51 and S52 illustrated in FIG. 21 above.

When it is determined in step S92 that there is an erase area (YES in step S92), the control unit 22 issues an erase request designating the erase area (a management area having an elapsed valid term) to the storage device 21 (step S93).

When the processing of step S93 is executed, erase processing based on the erase request issued by the control unit 22 (processing to collectively erase all data written to the erase area) is executed in the storage device 21, and a response corresponding to the erase request is sent back from the storage device 21 to the control unit 22.

Here, the control unit 22 determines whether or not the response sent back from the storage device 21 is a normal response (step S94).

When it is determined that the response sent back from the storage device 21 is a normal response (YES in step S94), the erase area from which data has been collectively erased is reported to the data management unit 22*c* (step S95).

Accordingly, in a case where an entry for a key assigned to the data written to the erase area exists in the fourth management information, the data management unit 22c is capable of removing this entry (that is, of updating the fourth management information).

Although it is described here that the erase area is reported to the data management unit 22c, the processing of step S95 may be omitted when, for example, the fourth management information does not include (management area information indicating) management areas.

Note that, when the response sent back from the storage device 21 is a normal response as mentioned above (that is, when data written to the erase area has been collectively erased), processing to update the aforementioned third management information (address conversion information) is executed in the storage device 21.

On the other hand, when the response sent back from the storage device 21 is not a normal response (that is, an error response) (NO in step S94), an error response is sent back to the application program executed in the application execution unit 22a, and the processing is ended, for example.

Although FIG. 35 illustrates that the erase request issued in step S93 is a request (command) instructing the storage device 21 to reliably erase data, the erase request may also be a request to establish a state in which it is not possible to refer to data written to the erase area, or may be a plurality of requests (a command group) to remove the erase area itself and to recreate the management areas.

As mentioned above, according to this embodiment, a storage system is capable of suppressing degradation of the non-volatile memories 211 as per the first embodiment above by means of a configuration in which, after logically partitioning the storage area of (the non-volatile memories 211 of) the storage device 21, which is controllable from the host side, data is written to one appropriate management area, among a plurality of management areas, which is determined based on valid terms as per an instruction from the host.

Fourth Embodiment

A fourth embodiment will be described next. In this embodiment, a configuration is assumed in which the storage device includes a plurality of non-volatile memories having different characteristics. More specifically, the foregoing first to third embodiments employ valid terms, which are provided to data as information for determining, from among a plurality of management areas obtained by partitioning the storage area of the non-volatile memories, a management area which is to serve as the write destination of the data, whereas, in this embodiment, the valid terms are also used to select the non-volatile memory to which the data is written.

FIG. 36 is a block diagram schematically illustrating the configuration of the storage device according to this embodiment. Note that, in FIG. 36, the same reference signs are assigned to parts like those of FIG. 1 above, and a detailed description thereof is omitted. Here, those parts which differ from FIG. 1 will mainly be described.

As illustrated in FIG. 36, a control unit 11 in a storage device 10 according to this embodiment includes a memory determination unit 11c. The memory determination unit 11c has a function for determining, from among a plurality of non-volatile memories 12, one non-volatile memory 12 to which data has been written, based on a valid term which has been set for the data under constraints defined in an area determination unit 11a. In a case where the non-volatile memory 12 is a NAND flash memory 102, for example, the memory determination unit 11c determines one or more blocks (physical blocks) constituting the storage area of the non-volatile memory 12. Note that a block is a basic rewrite unit of the NAND flash memory 102, as mentioned above.

Here, the relationship between the plurality of management areas (the plurality of areas obtained by logically partitioning the storage area of a non-volatile memories 12) which are managed in the storage device according to this embodiment and the plurality of non-volatile memories 12 will be described hereinbelow with reference to FIG. 37.

In the description hereinbelow, the plurality of non-volatile memories 12 are described as including non-volatile memories A to D. In the example illustrated in FIG. 37, a case is assumed in which non-volatile memory A is a quadruple level cell (QLC) NAND flash memory, non-volatile memories B and C are triple level cell (TLC) NAND flash memory, and non-volatile memory D is a single level cell (SLC) NAND flash memory. Such non-volatile memories A to D each have different characteristics. More specifically, for non-volatile memories A to D, whereas non-volatile memories A, B (C), and D have an increasingly high durability in that order, for example, non-volatile memories D, B (C), and A have an increasingly large capacity (storage area size) for data writing, in that order.

As illustrated in FIG. 37, the respective storage area of the non-volatile memories A to D is managed by being partitioned into management areas 201 to 208 as per FIG. 4 above. In this case, for example, management area 201 is constituted by at least one block constituting the storage area of non-volatile memory A (QLC), at least one block constituting the storage area of non-volatile memory B (TLC), at least one block constituting the storage area of non-volatile memory C (TLC), and at least one block constituting the storage area of non-volatile memory D (SLC). Although management area 201 is described here, the same is true for the other management areas 202 to 208.

Note that management areas 201 to 208 may be areas which are defined in a fixed manner in the storage device 10 or may be constituted (created) using appropriate timing by means of a function (area management function) for managing the management areas of the area determination unit 11a, for example. That is, in this embodiment, each of the plurality of management areas 201 to 208 only has to be configured to span across the storage area of the plurality of non-volatile memories A to D that have different characteristics.

Figure 38:
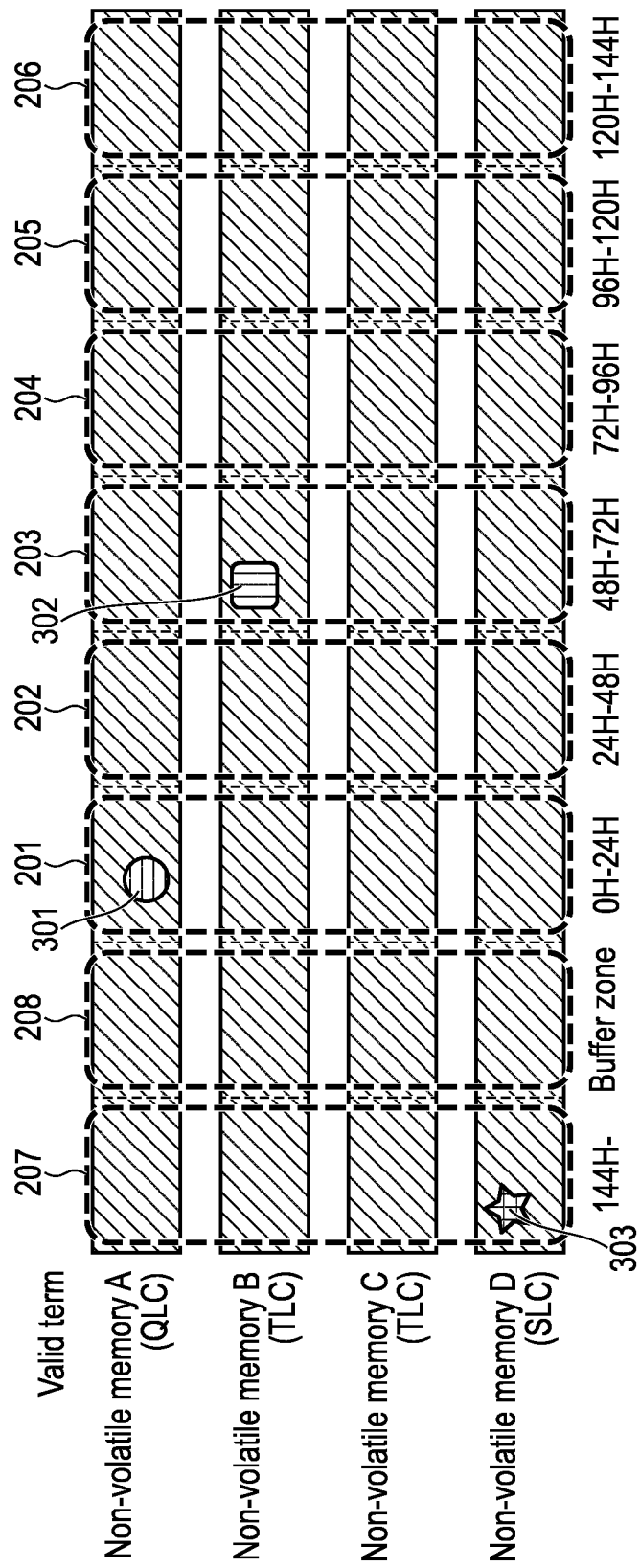
FIG. 38 is a diagram to illustrate a non-volatile memory which is determined as the write destination memory.

An example of the operation of the storage device 10 according to this embodiment will be described hereinbelow. Here, valid terms are assigned, as illustrated in FIG. 38, to each of the management areas 201 to 208 in a state where the management areas 201 to 208 illustrated in FIG. 37 are configured.

For example, when data 301, for which one hour has been set as the valid term, is to be written, the area determination unit 11a determines management area 201 as the write destination of the data 301 by means of the write destination determination processing described in the first embodiment above.

When the management area 201 thus determined has been configured from the storage area (at least one block) of each of the non-volatile memories A to D, the memory determination unit 11c determines one non-volatile memory (appearing as the "write destination memory" hereinbelow) from among the non-volatile memories A to D.

Here, an example of the processing by the memory determination unit 11c according to this embodiment will be described. In this embodiment, the memory determination unit 11c determines the write destination memory (block) based on the characteristics of each of the non-volatile memories A to D that impact the data hold time. Note that the characteristics of the non-volatile memories A to D, which are the basis for determining the write destination memory, include, for example, the degree of freshness (the write count or erase count) thereof, the multiple level value (SLC/MLC/TLC/QLC, or the like) thereof, and the control method thereof (a long or short hold time depending on the electrical properties when writing data), and so forth. Note that, in this embodiment, a "favorable degree of freshness" means a low write count and erase count of a non-volatile memory. Furthermore, in this embodiment, the "multiple level value" corresponds to the amount of data which can be written to the non-volatile memory (the memory cell levels), and the multiple level values of the non-volatile memories D (SLC), C and B (TLC), and A (QLC) increase in that order. Further, when the control method is used as the basis for determining the write destination memory, the control unit 11 is configured to be capable of performing control to write data, using the appropriate method, to the write destination memory (block) thus determined.

Furthermore, when a mixture of different types of non-volatile memories is used for the non-volatile memories A to D, such as NAND flash memory, NOR-type flash memory, STT-RAM, ReRAM, or PCM, the memory determination unit 11 may determine the write destination memory based on the data hold methods of each of the non-volatile memories A to D.

In addition, the memory determination unit 11c may determine the write destination memory based on the read frequency estimated for the data written in the storage device 10. Note that an assumed read frequency may be estimated from the valid term set for the data, for example, or may be estimated from a portion of the data (meta-information characterizing the data held in the beginning portion of the data, for example).

Because the processing to determine the write destination memory by the memory determination unit 11c depends on the storage device 10 being mounted, consideration may, by way of an example, be given to associating the lengths of the valid term, which has been set for data, with degrees of freshness, for example, though this embodiment is not limited to this arrangement. More specifically, in the case of data for which a long valid term has been set, for example, (a block constituting the storage area of) a non-volatile memory with a favorable degree of freshness is determined as the write destination memory. Thus, data which needs to be held on a long-term basis can be written to a non-volatile memory estimated to not be subject to advancing degradation.

The valid terms set for the data, and the multiple level values may also be associated with each other. More specifically, in the case of data for which a long valid term has been set, for example, (a block constituting the storage area of) a non-volatile memory which has a low multiple level value is determined as the write destination memory. Thus, data which needs to be held on a long-term basis can be written to a high-durability non-volatile memory (an SLC-type non-volatile memory, for example).

As mentioned above, the processing to determine the write destination memory described here may be determined through the execution of other processing.

Here, the valid term set for data 301 illustrated in FIG. 38 is one hour, as mentioned above, and relatively short. Hence, data 301 is written to the storage area of the non-volatile memory A (QLC) with a high multiple level value, for example, in management area 201.

Although a detailed description is omitted, data 302, for which 50 hours has been set as the valid term, is written to the storage area of the non-volatile memory B in management area 203. Further, data 303, for which 200 hours has been set as the valid term, is written to the storage area of the non-volatile memory D in management area 207.

Figures 39, 40:
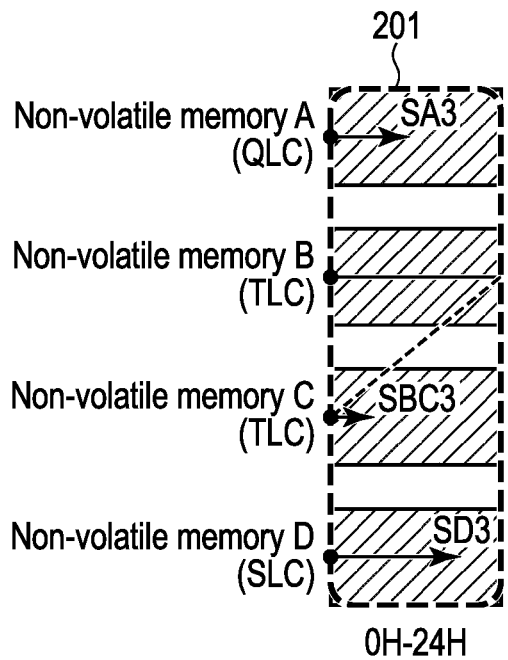
FIG. 39 is a diagram conceptually illustrating the write position of each non-volatile memory when performing additional writing.
FIG. 40 is a diagram illustrating an example of write start addresses managed for each group of non-volatile memories.

Note that, although it is described that additional writing is performed in the management area according to the first embodiment above, in this embodiment, additional writing within the storage area of the non-volatile memories A to D constituting the management area, as illustrated in FIG. 39, is performed. Additional writing may be performed individually for the respective storage area of the non-volatile memories A to D, or may be carried out for a group containing at least two of the non-volatile memories A to D. Note that a group of non-volatile memories is created based on the characteristics and the like of the non-volatile memories, for example.

In the example illustrated in FIG. 39, an aspect in which additional writing using the non-volatile memory A (QLC), a group including non-volatile memories B and C (TLC), and the non-volatile memory D (SLC), respectively, is managed. In FIG. 39, arrow SA3 points to the next write position (write destination) in the storage area of non-volatile memory A in management area 201. Further, arrow SBC3 points to the next write position (write destination) in the storage area of the group of non-volatile memories B and C in management area 201. Note that a case is assumed where, in the group of non-volatile memories B and C, data has already been written to the storage area of non-volatile memory B in management area 201, and arrow SBC3 points to within the storage area of non-volatile memory C. Likewise, arrow SD3 points to the next write position (write destination) in the storage area of non-volatile memory D in management area 201.

According to this embodiment, in order to perform management like that illustrated in FIG. 39, the memory determination unit 11c manages write start addresses (information) for each of the non-volatile memory A, the group of non-volatile memories B and C, and the non-volatile memory D that provide the storage area constituting the management areas 201 to 208 as illustrated in FIG. 40.

More specifically, in FIG. 40, write destination addresses "SA1" to "SA8" for the storage area of non-volatile memory A in each of the management areas 201 to 208 are managed in association with each of management area information items "N1" to "N8" representing management areas 201 to 208, and a "memory A" representing non-volatile memory A.

Further, write destination addresses "SBC1" to "SBC8" for the storage area of non-volatile memories B and C in each of management areas 201 to 208 are managed in association with each of the management area information items "N1" to "N8" and "memories B, C" representing the group of non-volatile memories B and C.

In addition, write destination addresses "SD1" to "SD8" for the storage area of non-volatile memory D in each of management areas 201 to 208 are managed in association with each of the management area information items "N1" to "N8" and "memory D" representing non-volatile memory D.

The basic operation of the storage device 10 (memory determination unit 11c) according to this embodiment has been described here, and there could potentially be a concentration of data writing to a specific non-volatile memory.

To this end, the memory determination unit 11c may determine the write destination memory (the non-volatile memory to which data is written) by using information other than the valid terms set for the data. More specifically, the memory determination unit 11c may determine the write destination memory by taking into account the size of data, for example. In this case, a non-volatile memory (non-volatile memory D, for example) having a low multiple level value can be determined as the write destination memory if the value calculated by dividing the valid term by the data size (valid term/size) is large, and a non-volatile memory (non-volatile memory A, for example) having a high multiple level value can be determined as the write destination memory if this value is small, for example.

Note that it must be possible to use an appropriate address to access (the blocks constituting the storage area of) the non-volatile memory 12 determined by the memory determination unit 11c. For example, when the foregoing first embodiment is expanded upon and applied to this embodiment, internal addresses corresponding to the blocks constituting the storage area of the non-volatile memory 12 determined by the memory determination unit 11c only has to be stored in a physical address field in the second management information illustrated in FIGS. 18 to 20 above.

Meanwhile, when the foregoing second embodiment is expanded upon and applied to this embodiment, an appropriate conversion between the internal address and external address can be performed by storing the address corresponding to the block constituting the storage area of the non-volatile memory 12 determined by the memory determination unit 11c in the internal address field in the third management information illustrated in FIGS. 26 and 27 above.

Furthermore, when the foregoing third embodiment is expanded upon and applied to this embodiment, because the control unit 22 on the host side uses the address reported by the storage device 10 as is, there is no need to modify the fourth management information illustrated in FIG. 32 above. However, because the write start addresses of the non-volatile memories 12 constituting the storage device 10 must be managed, the fifth management information (write start address management information) illustrated in FIG. 33 is updated as illustrated in FIG. 40 above.

Note that, although a detailed description is omitted, in the write processing (operating sequence) of the storage device 10 according to this embodiment, processing to determine the write destination memory only has to be executed after the write destination determination processing (the processing to determine the management area to which data is written) in the write processing described in the embodiments.

Furthermore, although, in this embodiment, it is described that management areas are constituted (allocated) so as to span across all the storage area of each of the plurality of non-volatile memories 12 (non-volatile memories A to D), management areas 201 to 208 may each be constituted from some of the storage area of non-volatile memories A to D, as illustrated in FIG. 41, for example. More specifically, management area 201 is constituted from the storage area of non-volatile memories B to D, for example. Furthermore, management area 202 is constituted from the storage area of non-volatile memories B and C, for example. Note that, as per management area 203, a management area may be constituted from only the storage area of one non-volatile memory.

Note that, when the management areas are constituted from some of the storage area of the non-volatile memories A to D as illustrated in FIG. 41, there is no need to manage the write start addresses of the storage area of the non-volatile memories which do not constitute these management areas (unused storage area of the non-volatile memories in the management areas).

As mentioned above, in this embodiment, management areas are constituted from the storage area of each of a plurality of non-volatile memories 12 (non-volatile memories A to D) having different characteristics, and a non-volatile memory (write destination memory) to which data is to be written is determined based on a valid term which has been set for data included in a write request, and the characteristics of each of the plurality of non-volatile memories 12. Accordingly, degradation of the storage device can be suppressed, and an efficient operation can be realized by taking into account the characteristics of the non-volatile memories 12.

Fifth Embodiment

A fifth embodiment will be described next. In the foregoing fourth embodiment, a configuration is described in which the storage device 10 is provided with a plurality of non-volatile memories having different characteristics; however, in this embodiment, the foregoing third embodiment is expanded upon and a storage system provided with a plurality of storage devices having different characteristics is constructed.

Figure 42:
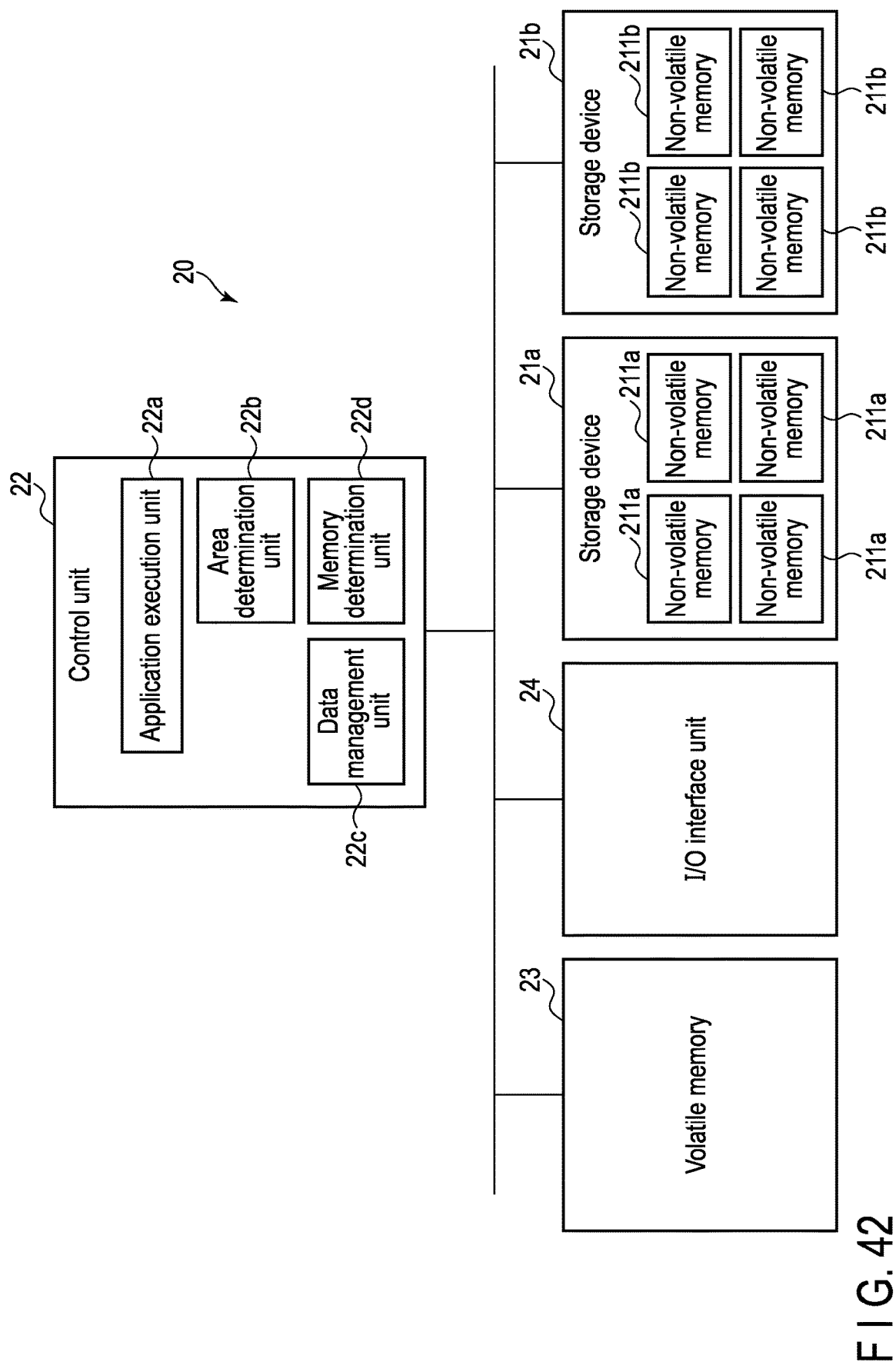
FIG. 42 is a block diagram schematically illustrating an example of the configuration of a storage system according to a fifth embodiment.

FIG. 42 is a block diagram schematically illustrating the configuration of the storage system according to this embodiment. Note that, in FIG. 42, the same reference signs are assigned to parts like those of FIG. 28 above, and a detailed description thereof is omitted. Here, those parts which differ from FIG. 28 will mainly be described.

As illustrated in FIG. 42, a storage system 20 according to this embodiment includes storage devices 21a and 21b. The storage device 21a is provided with a plurality of non-volatile memories 211a. The storage device 21b is provided with a plurality of non-volatile memories 211b. The storage devices 21a and 21b are storage devices that have respectively different characteristics. Note that, although an example is illustrated in FIG. 42 in which the storage system 20 is provided with the two storage devices 21a and 21b, the number of storage devices which the storage system 20 is provided with may be three or more.

Furthermore, the control unit 22 provided to the storage system 20 includes a storage determination unit 22d.

In this embodiment, a plurality of management areas, which are obtained by logically partitioning the storage area of the storage device 21a (the plurality of non-volatile memories 211a) and the storage device 21b (the plurality of non-volatile memories 211b), are managed, and data is written to the management areas. The plurality of management areas are each constituted from the storage area of the storage device 21a and the storage area of the storage device 21b.

In this case, the storage determination unit 22d has a function for determining the storage device to which data is written from among the plurality of storage devices 21a and 21b, based on a valid term which has been set for the data, and the like. An overview of the operation of the storage system 20 according to this embodiment is provided hereinbelow, and the storage system 20 operates, in principle, pursuant to the content described in the foregoing fourth embodiment. That is, whereas, in the foregoing fourth embodiment, an appropriate non-volatile memory to which data is written is determined from among the plurality of non-volatile memories constituting one management area, in this embodiment, an appropriate storage device to which data is written is determined from the plurality of storage devices 21a and 21b constituting one management area.

Note that, management of the data written to the management areas and management of write start addresses can be achieved by adding a field for storing information (identifiers) for identifying the storage devices 21a and 21b to the information for this management (the second management information illustrated in FIGS. 18 to 20 and fifth management information illustrated in FIG. 33).

Further, although, in the foregoing fourth embodiment, it is described that one non-volatile memory is determined based on the valid term which has been set for the data and the characteristics of the plurality of non-volatile memories, and so forth, in this embodiment, one storage device (appearing as "write destination storage device" hereinbelow) only has to be determined based on the valid term which has been set for the data and the characteristics of the storage devices 21a and 21b, similarly to the foregoing fourth embodiment. In addition, in this embodiment, the write destination storage device may be determined, for example, by taking into account the state of the network (the bus depending on the implementation) connecting the storage devices 21a and 21b to the host-side control unit 22. More specifically, in a case where the same management area is constituted by the storage area of the storage device 21a and the storage area of the storage device 21b, when the management area is determined by the area determination unit 22b as the write destination, the storage determination unit 22d may apply an algorithm to preferentially determine, as write destination storage, the storage device, among the storage devices 21a and 21b, which is not subject to network congestion (that is, which has a favorable network environment).

As mentioned above, in this embodiment, using a storage system including a plurality of storage devices 21a and 21b, it is also possible to suppress degradation of the storage devices 21a and 21b in the same way as the foregoing embodiments, and an efficient operation can be achieved by taking into account the characteristics of the storage devices 21a and 21b.

Note that, in this embodiment, it is described that one storage device of the plurality of storage devices 21a and 21b is determined as the write destination storage device to which data is written, and the foregoing fourth embodiment may be further applied to the write destination storage device thus determined. More specifically, when the management area determined as the write destination is constituted from the storage area of each of a plurality of non-volatile memories provided to the write destination storage device, a configuration is also possible in which a non-volatile memory to which data is written is further determined from among the plurality of non-volatile memories.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device, comprising:
a non-volatile memory including a plurality of blocks, each of the blocks being a unit of data erasing; and
a control unit that is electrically connected to the non-volatile memory and that is configured to control the non-volatile memory, wherein
the control unit is configured to:
manage a plurality of management areas obtained by logically partitioning storage area of the non-volatile memory,
manage a reference time of the storage device,
when a write request is received that includes data for which a valid term has been set, determine, based on the valid term and the reference time, a first management area from among the plurality of management areas, the valid term being a term during which the data is to be stored in the storage device,
write the data included in the write request to the determined first management area, and
when the data written to the determined first management area is erased, erase all data written in the first management area which includes the data;
non-overlapping valid terms are respectively assigned to the plurality of management areas;
the control unit is configured to determine the first management area which has been assigned the valid term that includes an end time of the valid term set for the data included in the write request;
the plurality of management areas includes the first management area to which a first valid term is assigned and a second management area to which a second valid term longer than the first valid term is assigned;
when the first valid term assigned to the first management area has elapsed, the second valid term assigned to the second management area is shortened based on the first valid term; and
when the valid term assigned to the first management area to which the data is written has elapsed, the control unit is configured to collectively erase all data written to the first management area.

2. The storage device according to claim 1, wherein the control unit is configured to write the data included in the write request to the first management area so as to be additionally written at the logical end of data that has been allocated in a contiguous manner.

3. The storage device according to claim 2,
wherein, when free capacity of the determined first management area is inadequate, the control unit is configured to:
write a portion of the data to the free capacity of the first management area,
erase other data, which has been written at the beginning of the first management area, to secure capacity of a size enabling the remaining data not included in the portion of the data written to the free capacity, and
write the remaining data, starting at the beginning of the first management area.

4. The storage device according to claim 1, wherein, when free capacity of the determined first management area is inadequate, the control unit is configured to write the data to a second management area to which a valid term longer than the valid term which has been set for the data is assigned.

5. The storage device according to claim 4, wherein the control unit is configured to determine, within the second management area to which a valid term longer than the valid term se for the data is assigned, the second management area to which the data is written, based on at least one of the valid term assigned to the second management area, the free capacity of the second management area, and a write frequency and read frequency to/from the second management area.

6. The storage device according to claim 1, wherein, when free capacity of the determined first management area is inadequate, the control unit is configured to write the data to a second management area to which the valid term is not assigned.

7. The storage device according to claim 1,
wherein the determined first management area includes storage area of each of a plurality of non-volatile memories having different characteristics, and
the control unit is configured to determine a non-volatile memory to which the data included in the write request is to be written, based on the valid term which has been set for the data, and the characteristics of each of the non-volatile memories.

8. The storage device according to claim 1, wherein
each of the plurality of management areas corresponds to one or more blocks of a plurality of blocks,
the control unit is further configured to erase one or more blocks in which all data written in the first management area which includes the data is stored, and
the erasing all data written in the first management area which includes the data includes erasing one or more blocks in which all the data written in the first management area which includes the data is stored.

9. A storage system, comprising:
a storage device comprising a non-volatile memory including a plurality of blocks, each of the blocks being a unit of data erasing; and
a control unit that is electrically connected to the storage device and that is configured to control the non-volatile memory, wherein
the control unit is configured to:
managing a plurality of management areas obtained by logically partitioning storage area of the non-volatile memory provided to the storage device, each of the plurality of management areas corresponding to at least one or more blocks of the plurality of blocks,
manage a reference time of the storage device,
when a write request is received that includes data for which a valid term has been set, determine, based on the valid term and the reference time, a first management area from among the plurality of management areas, the valid term being a term during which the data is to be stored in the storage device,
write the data included in the write request to the determined first management area, and
when the data written to the determined first management area is erased, erase all data written in the first management area which includes the data;
non-overlapping valid terms are respectively assigned to the plurality of management areas;
the control unit is configured to determine the first management area which has been assigned the valid term that includes an end time of the valid term set for the data included in the write request;
the plurality of management areas includes the first management area to which a first valid term is assigned and a second management area to which a second valid term longer than the first valid term is assigned;
when the first valid term assigned to the first management area has elapsed, the second valid term assigned to the second management area is shortened based on the first valid term; and
when the valid term assigned to the first management area to which the data is written has elapsed, the control unit is configured to collectively erase all data written to the first management area.

10. A method, comprising:
managing a plurality of management areas obtained by logically partitioning storage area of a non-volatile memory including a plurality of blocks, each of the blocks being a unit of data erasing, each of the plurality of management areas corresponding to at least one or more blocks of the plurality of blocks;
managing a reference time of a storage device;
when a write request is received that includes data for which a valid term has been set, determining, based on the valid term and the reference time, a first management area from among the plurality of management areas, the valid term being a term during which the data is to be stored in the storage device;
writing the data included in the write request to the determined first management area;
when the data written to the determined first management area is erased, erasing all data written in the first management area which includes the data;
respectively assigning non-overlapping valid terms to the plurality of management areas, the plurality of management areas including the first management area to which a first valid term is assigned and a second management area to which a second valid term longer than the first valid term is assigned;
determining the first management area which has been assigned the valid term that includes an end time of the valid term set for the data included in the write request;
when the first valid term assigned to the first management area has elapsed, shortening the second valid term assigned to the second management area based on the first valid term; and
when the valid term assigned to the first management area to which the data is written has elapsed, collectively erasing all data written to the first management area.

* * * * *